US010895784B2

(12) United States Patent
Oh et al.

(10) Patent No.: US 10,895,784 B2
(45) Date of Patent: Jan. 19, 2021

(54) PATTERNING OF LIQUID CRYSTALS USING SOFT-IMPRINT REPLICATION OF SURFACE ALIGNMENT PATTERNS

(71) Applicant: Magic Leap, Inc., Dania Beach, FL (US)

(72) Inventors: Chulwoo Oh, Cedar Park, TX (US); Chieh Chang, Cedar Park, TX (US); Sharad D. Bhagat, Austin, TX (US); Michael Anthony Klug, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/841,037

(22) Filed: Dec. 13, 2017

(65) Prior Publication Data

US 2018/0164645 A1 Jun. 14, 2018

Related U.S. Application Data

(60) Provisional application No. 62/434,343, filed on Dec. 14, 2016.

(51) Int. Cl.
*B32B 43/00* (2006.01)
*G02F 1/1337* (2006.01)
(Continued)

(52) U.S. Cl.
CPC ........ *G02F 1/133788* (2013.01); *C09K 19/00* (2013.01); *G02B 27/017* (2013.01);
(Continued)

(58) Field of Classification Search
CPC . B32B 38/10; B32B 43/006; Y10T 156/1153; Y10T 156/1158;
(Continued)

(56) References Cited

U.S. PATENT DOCUMENTS 4,693,544 A 9/1987 Yamasaki et al.
4,991,924 A 2/1991 Shankar et al.
(Continued)

FOREIGN PATENT DOCUMENTS

CN 101133348 B 9/2010
CN 102683803 9/2012
(Continued)

OTHER PUBLICATIONS

Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages.
(Continued)

*Primary Examiner* — Mark A Osele
*Assistant Examiner* — Nickolas R Harm
(74) *Attorney, Agent, or Firm* — Knobbe, Martens, Olson & Bear, LLP

(57) ABSTRACT

Soft-imprint alignment processes for patterning liquid crystal polymer layers via contact with a reusable alignment template are described herein. An example soft-imprint alignment process includes contacting a liquid crystal polymer layer with a reusable alignment template that has a desired surface alignment pattern such that the liquid crystal molecules of the liquid crystal polymer are aligned to the surface alignment pattern via chemical, steric, or other intermolecular interaction. The patterned liquid crystal polymer layer may then be polymerized and separated from the reusable alignment template. The process can be repeated many times. The reusable alignment template may include a photo-alignment layer that does not comprise surface relief structures that correspond to the surface alignment pattern and a release layer above this photo-alignment layer. A
(Continued)

reusable alignment template and methods of fabricating the same are also disclosed.

20 Claims, 16 Drawing Sheets

(51) Int. Cl.
    *G02B 27/01*            (2006.01)
    *C09K 19/00*            (2006.01)
    *G02F 1/1333*           (2006.01)
    *B32B 38/10*            (2006.01)

(52) U.S. Cl.
    CPC ... *G02B 27/0172* (2013.01); *G02F 1/133365* (2013.01); *B32B 38/10* (2013.01); *B32B 43/006* (2013.01); *B32B 2305/55* (2013.01); *G02F 1/13378* (2013.01); *G02F 2202/023* (2013.01); *Y10T 156/1153* (2015.01); *Y10T 156/1158* (2015.01); *Y10T 156/1195* (2015.01); *Y10T 156/1911* (2015.01); *Y10T 156/1917* (2015.01); *Y10T 156/1994* (2015.01)

(58) Field of Classification Search
    CPC ......... Y10T 156/1195; Y10T 156/1911; Y10T 156/1917; Y10T 156/1994
    USPC ................................ 156/711, 712, 752, 753
    See application file for complete search history.

(56) References Cited

U.S. PATENT DOCUMENTS

| | | |
|---|---|---|
| 5,187,372 A | 2/1993 | Clube |
| 5,544,268 A | 8/1996 | Bishel et al. |
| 5,566,982 A | 10/1996 | Lehureau et al. |
| 5,808,797 A | 9/1998 | Bloom et al. |
| 5,825,448 A | 10/1998 | Bos et al. |
| 5,915,051 A | 6/1999 | Damask et al. |
| 6,014,197 A | 1/2000 | Hikmet |
| 6,040,885 A | 3/2000 | Koike et al. |
| 6,181,393 B1 | 1/2001 | Enomoto et al. |
| 6,188,462 B1 | 2/2001 | Lavrentovich et al. |
| 6,334,960 B1 | 1/2002 | Willson et al. |
| 6,542,671 B1 | 4/2003 | Ma et al. |
| 6,680,767 B2 | 1/2004 | Coates et al. |
| 6,690,845 B1 | 2/2004 | Yoshimura et al. |
| 6,735,224 B2 | 5/2004 | Murry et al. |
| 6,750,941 B2 | 6/2004 | Satoh et al. |
| 6,850,221 B1 | 2/2005 | Tickle |
| 6,873,087 B1 | 3/2005 | Choi et al. |
| 6,900,881 B2 | 5/2005 | Sreenivasan et al. |
| 6,982,818 B2 | 1/2006 | Riza et al. |
| D514,570 S | 2/2006 | Ohta |
| 7,023,466 B2 | 4/2006 | Favalora et al. |
| 7,070,405 B2 | 7/2006 | Sreenivasan et al. |
| 7,098,572 B2 | 8/2006 | Choi et al. |
| 7,122,482 B2 | 10/2006 | Xu et al. |
| 7,140,861 B2 | 11/2006 | Watts et al. |
| 7,206,107 B2 | 4/2007 | Levola |
| 7,341,348 B2 | 3/2008 | Eagan |
| 7,375,784 B2 | 5/2008 | Smith et al. |
| 7,471,362 B1 | 12/2008 | Jones |
| 7,519,096 B2 | 4/2009 | Bouma et al. |
| 7,573,640 B2 | 8/2009 | Nivon et al. |
| 7,692,759 B2 | 4/2010 | Escuti et al. |
| 7,705,943 B2 | 4/2010 | Kume et al. |
| 8,064,035 B2 | 11/2011 | Escuti et al. |
| 8,076,386 B2 | 12/2011 | Xu et al. |
| 8,160,411 B2 | 4/2012 | Levola et al. |
| 8,233,204 B1 | 7/2012 | Robbins et al. |
| 8,248,458 B2 | 8/2012 | Schowengerdt et al. |
| 8,264,623 B2 | 9/2012 | Marrucci |
| 8,339,566 B2 | 12/2012 | Escuti et al. |
| 8,508,848 B2 | 8/2013 | Saarikko |
| 8,757,812 B2 | 6/2014 | Melville et al. |
| 8,885,161 B2 | 11/2014 | Scheeline et al. |
| 8,885,997 B2 | 11/2014 | Nguyen et al. |
| 8,950,867 B2 | 2/2015 | Macnamara |
| 9,081,426 B2 | 7/2015 | Armstrong |
| 9,195,092 B2 | 11/2015 | Escuti et al. |
| 9,215,293 B2 | 12/2015 | Miller |
| D752,529 S | 3/2016 | Loretan et al. |
| 9,310,559 B2 | 4/2016 | Macnamara |
| 9,345,402 B2 | 5/2016 | Gao |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,575,366 B2 | 2/2017 | Srivastava et al. |
| 9,664,905 B2 | 5/2017 | Bohn et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,846,967 B2 | 12/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski et al. |
| 9,933,684 B2 | 4/2018 | Brown et al. |
| 10,025,160 B2 | 7/2018 | Park et al. |
| 10,156,725 B2 | 12/2018 | TeKolste et al. |
| 10,191,288 B2 | 1/2019 | Singer et al. |
| 10,254,454 B2 | 4/2019 | Klug et al. |
| 10,260,864 B2 | 4/2019 | Edwin et al. |
| 10,261,318 B2 | 4/2019 | Tekolste et al. |
| 10,345,592 B2 | 7/2019 | Samec et al. |
| 10,466,478 B2 | 11/2019 | Klug et al. |
| 10,466,561 B2 | 11/2019 | Oh |
| 10,690,826 B2 | 6/2020 | Klug et al. |
| 2002/0097962 A1 | 7/2002 | Yoshimura et al. |
| 2002/0126249 A1 | 9/2002 | Liang et al. |
| 2002/0167638 A1 | 11/2002 | Byun et al. |
| 2002/0172237 A1 | 11/2002 | Murry et al. |
| 2003/0147112 A1 | 8/2003 | Mukawa |
| 2003/0161573 A1 | 8/2003 | Ishida |
| 2004/0007465 A1 | 1/2004 | Goldberg et al. |
| 2004/0022888 A1 | 2/2004 | Sreenivasan et al. |
| 2004/0120647 A1 | 6/2004 | Sakata et al. |
| 2004/0150141 A1 | 8/2004 | Chao et al. |
| 2004/0184163 A1 | 9/2004 | Nishioka et al. |
| 2004/0191429 A1 | 9/2004 | Patrick |
| 2005/0042391 A1 | 2/2005 | Ryan et al. |
| 2005/0072959 A1 | 4/2005 | Moia et al. |
| 2005/0073577 A1 | 4/2005 | Sudo et al. |
| 2005/0232530 A1 | 10/2005 | Kekas |
| 2005/0253112 A1 | 11/2005 | Kelly et al. |
| 2005/0270312 A1 | 12/2005 | Lad et al. |
| 2005/0270461 A1 | 12/2005 | Kitson et al. |
| 2006/0120247 A1 | 6/2006 | Noda et al. |
| 2006/0121358 A1 | 6/2006 | Rich et al. |
| 2006/0126179 A1 | 6/2006 | Levola |
| 2006/0157443 A1 | 7/2006 | Mei |
| 2006/0221448 A1 | 10/2006 | Nivon et al. |
| 2006/0227283 A1 | 10/2006 | Ooi et al. |
| 2007/0031097 A1 | 2/2007 | Heikenfeld et al. |
| 2007/0229955 A1 | 10/2007 | Kawamura et al. |
| 2007/0273957 A1 | 11/2007 | Zalevsky et al. |
| 2008/0043166 A1 | 2/2008 | Liu et al. |
| 2008/0043334 A1 | 2/2008 | Ltzkovitch et al. |
| 2008/0169479 A1 | 7/2008 | Xu et al. |
| 2009/0141216 A1 | 6/2009 | Marrucci |
| 2010/0142570 A1 | 6/2010 | Konttinen et al. |
| 2010/0207964 A1 | 8/2010 | Kimmel et al. |
| 2010/0225876 A1 | 9/2010 | Escuti et al. |
| 2010/0277803 A1 | 11/2010 | Pockett et al. |
| 2010/0284090 A1 | 11/2010 | Simmonds |
| 2010/0321781 A1 | 12/2010 | Levola et al. |
| 2011/0002143 A1 | 1/2011 | Saarikko et al. |
| 2011/0024950 A1 | 2/2011 | Kruglick |
| 2011/0049761 A1 | 3/2011 | Mataki |

(56) References Cited

U.S. PATENT DOCUMENTS

| | | |
|---|---|---|
| 2011/0194058 A1 | 8/2011 | Amos et al. |
| 2011/0213664 A1 | 9/2011 | Osterhout et al. |
| 2011/0242461 A1 | 10/2011 | Escuti et al. |
| 2012/0021140 A1* | 1/2012 | Dijksman ............. B82Y 10/00 427/595 |
| 2012/0033306 A1 | 2/2012 | Valera et al. |
| 2012/0127062 A1 | 5/2012 | Bar-Zeev et al. |
| 2012/0162549 A1 | 6/2012 | Gao et al. |
| 2012/0206485 A1 | 8/2012 | Osterhout et al. |
| 2012/0206812 A1 | 8/2012 | Saito et al. |
| 2012/0218301 A1 | 8/2012 | Miller |
| 2012/0242918 A1 | 9/2012 | Valyukh et al. |
| 2012/0327330 A1 | 12/2012 | Takahashi et al. |
| 2013/0051730 A1 | 2/2013 | Travers et al. |
| 2013/0082922 A1 | 4/2013 | Miller |
| 2013/0125027 A1 | 5/2013 | Abovitz |
| 2013/0222384 A1 | 8/2013 | Futterer |
| 2013/0235440 A1 | 9/2013 | Takeda et al. |
| 2013/0242392 A1 | 9/2013 | Amirparviz et al. |
| 2013/0314765 A1 | 11/2013 | Padilla et al. |
| 2013/0314789 A1 | 11/2013 | Saarikko et al. |
| 2013/0321747 A1 | 12/2013 | Kondo et al. |
| 2013/0322810 A1 | 12/2013 | Robbins |
| 2014/0055740 A1 | 2/2014 | Spaulding et al. |
| 2014/0064655 A1 | 3/2014 | Nguyen et al. |
| 2014/0071539 A1 | 3/2014 | Gao |
| 2014/0104665 A1 | 4/2014 | Popovich et al. |
| 2014/0140653 A1 | 5/2014 | Brown et al. |
| 2014/0140654 A1 | 5/2014 | Brown et al. |
| 2014/0177023 A1 | 6/2014 | Gao et al. |
| 2014/0211322 A1 | 7/2014 | Bohn et al. |
| 2014/0218468 A1 | 8/2014 | Gao et al. |
| 2014/0232993 A1 | 8/2014 | Kim |
| 2014/0233879 A1 | 8/2014 | Gibson et al. |
| 2014/0300695 A1 | 10/2014 | Smalley et al. |
| 2014/0306866 A1 | 10/2014 | Miller et al. |
| 2015/0015879 A1 | 1/2015 | Papadopoulos et al. |
| 2015/0016777 A1 | 1/2015 | Abovitz et al. |
| 2015/0062500 A1 | 3/2015 | Park et al. |
| 2015/0103306 A1 | 4/2015 | Kaji et al. |
| 2015/0146147 A1 | 5/2015 | Choi et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0205182 A1 | 7/2015 | Leister |
| 2015/0222883 A1 | 8/2015 | Welch |
| 2015/0222884 A1 | 8/2015 | Cheng |
| 2015/0234205 A1 | 8/2015 | Schowengerdt |
| 2015/0241705 A1 | 8/2015 | Abovitz et al. |
| 2015/0268415 A1 | 9/2015 | Schowengerdt et al. |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0033698 A1 | 2/2016 | Escuti et al. |
| 2016/0033771 A1 | 2/2016 | Tremblay et al. |
| 2016/0041390 A1 | 2/2016 | Poon et al. |
| 2016/0055801 A1 | 2/2016 | Kim et al. |
| 2016/0077338 A1 | 3/2016 | Robbins et al. |
| 2016/0085300 A1 | 3/2016 | Robbins et al. |
| 2016/0097930 A1 | 4/2016 | Robbins et al. |
| 2016/0116739 A1 | 4/2016 | TeKolste et al. |
| 2016/0116979 A1 | 4/2016 | Border |
| 2016/0167422 A1 | 6/2016 | Brehm et al. |
| 2016/0209648 A1 | 7/2016 | Haddick et al. |
| 2016/0270656 A1 | 9/2016 | Samec et al. |
| 2016/0282808 A1 | 9/2016 | Smalley |
| 2016/0320536 A1 | 11/2016 | Simmonds et al. |
| 2017/0010466 A1 | 1/2017 | Klug et al. |
| 2017/0010488 A1 | 1/2017 | Klug et al. |
| 2017/0131595 A1 | 5/2017 | Yim et al. |
| 2017/0322419 A1 | 11/2017 | TeKolste et al. |
| 2017/0373459 A1 | 12/2017 | Weng et al. |
| 2018/0004289 A1 | 1/2018 | Wilson et al. |
| 2018/0046859 A1 | 2/2018 | Jarvenpaa |
| 2018/0113309 A1 | 4/2018 | Robbins et al. |
| 2018/0113310 A1 | 4/2018 | Rolland et al. |
| 2018/0143438 A1 | 5/2018 | Oh |
| 2018/0143470 A1 | 5/2018 | Oh et al. |
| 2018/0143485 A1 | 5/2018 | Oh |
| 2018/0143509 A1 | 5/2018 | Oh |
| 2018/0188528 A1 | 7/2018 | Browy |
| 2018/0188542 A1 | 7/2018 | Waldern et al. |
| 2018/0217395 A1 | 8/2018 | Lin et al. |
| 2018/0239177 A1 | 8/2018 | Oh |
| 2018/0275350 A1 | 9/2018 | Oh |
| 2018/0275409 A1 | 9/2018 | Gao |
| 2019/0033684 A1 | 1/2019 | Favalora et al. |
| 2019/0086674 A1 | 3/2019 | Sinay et al. |
| 2019/0121142 A1 | 4/2019 | Tekolste |
| 2019/0227211 A1 | 7/2019 | Klug et al. |
| 2019/0243141 A1 | 8/2019 | TeKolste |
| 2019/0243142 A1 | 8/2019 | TeKolste |
| 2020/0174304 A1 | 6/2020 | Oh |

FOREIGN PATENT DOCUMENTS

| | | |
|---|---|---|
| CN | 104145208 | 11/2014 |
| EP | 0 132 077 | 1/1985 |
| EP | 0 415 735 | 3/1991 |
| EP | 0 549 283 | 6/1993 |
| EP | 2 065 750 | 6/2009 |
| EP | 2 664 430 | 11/2013 |
| JP | 62-269174 | 11/1987 |
| JP | 1991-84516 | 4/1991 |
| JP | 2005-316304 | 11/2005 |
| JP | 2005-316314 | 11/2005 |
| JP | 2010-271565 | 12/2010 |
| JP | 2014-132328 | 7/2014 |
| JP | 2014-156167 | 10/2014 |
| JP | 2014-224846 | 12/2014 |
| WO | WO 2005/024469 | 3/2005 |
| WO | WO 2006/064301 | 6/2006 |
| WO | WO 2006/092758 | 9/2006 |
| WO | WO 2006/106501 | 10/2006 |
| WO | WO 2008/130555 | 10/2008 |
| WO | WO 2008/130561 | 10/2008 |
| WO | WO 2010/067114 | 6/2010 |
| WO | WO 2013/054115 | 4/2013 |
| WO | WO 2014/016403 | 1/2014 |
| WO | WO 2014/036537 | 3/2014 |
| WO | WO 2014/091204 | 6/2014 |
| WO | WO 2014/172252 | 10/2014 |
| WO | WO 2015/081313 | 6/2015 |
| WO | WO 2016/054092 | 4/2016 |
| WO | WO 2016/082031 | 6/2016 |
| WO | WO 2016/113533 | 7/2016 |
| WO | WO 2016/205249 | 12/2016 |
| WO | WO 2016/205256 | 12/2016 |
| WO | WO 2018/093730 | 5/2018 |
| WO | WO 2018/094079 | 5/2018 |
| WO | WO 2018/094093 | 5/2018 |
| WO | WO 2018/106963 | 6/2018 |
| WO | WO 2018/112101 | 6/2018 |
| WO | WO 2018/156779 | 8/2018 |
| WO | WO 2018/156784 | 8/2018 |
| WO | WO 2018/175343 | 9/2018 |
| WO | WO 2018/175488 | 9/2018 |
| WO | WO 2020/069026 | 4/2020 |

OTHER PUBLICATIONS

Escuti, M. et al., "39.4: Polarization-independent switching with high contrast from a liquid crystal polarization grating", SID Symposium Digest, vol. 37, pp. 1443-1446, Jun. 2006, in 5 pages.

Escuti, M. et al., "Polarization-Independent LC Microdisplays Using Liquid Crystal Polarization Gratings: A Viable Solution", ILCC presentation, Jul. 1, 2008, in 15 pages.

(56) References Cited

OTHER PUBLICATIONS

Kim, J. et al., "Wide-angle, nonmechanical beam steering with high throughput utilizing polarization gratings", Applied Optics, Jun. 10, 2011, 50(17)2635-2639.
Komanduri, R. et al., "18:3: Late-News Paper: Polarization Independent Liquid Crystal Microdisplays", SID Digest, vol. 39, No. 1, pp. 236-239, May 2008, in 4 pages.
Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.
Komanduri, R. et al., "Elastic Continuum Analysis of the Liquid Crystal Polarization Grating", Physical review. E, Statistical, non-linear, and soft matter physics, May 25, 2007, pp. 1-8.
Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.
Komanduri, R. et al., "Polarization-independent modulation for projection displays using small-period LC polarization gratings", Journal of the Society for information display, Aug. 2007; 15(8):589-594.
Lim, Y. et al., "Anisotropic Nano-Imprinting Technique for Fabricating a Patterned Optical Film of a Liquid Crystalline Polymer", Journal of Nanoscience and Nanotechnology, Oct. 2008; 8(9):4775-4778.
Lin, R. et al. Molecular-Scale soft imprint lithography for alignment layers in liquid crystal devices; Nano Letters, 2007, 7(6): 1613-1621.
Nikolova et al., "Diffraction Efficiency and Selectivity of Polarization Holographic Recording", Optica Acta, 1984, 31(5):579-588.
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh, C. et al., "Numerical analysis of polarization gratings using the finite-difference time-domain method", Physical review A, Oct. 12, 2007, 76:043815-1-043815-8.
Oh, C. et al., "Polarization-Independent Modulation using Standard LCDs and Polymer PGs", 2008, in 6 pages.
Oh, C. et al., 16.2: Polarization-Independent Modulation Using Standard Liquid Crystal Microdisplays and Polymer Polarization Gratings, IDRC, 2008, 298-301.
U.S. Appl. No. 15/815,250, filed Nov. 16, 2017.
U.S. Appl. No. 15/815,449, filed Nov. 16, 2017.
U.S. Appl. No. 15/815,567, filed Nov. 16, 2017.
International Search Report and Written Opinion for PCT Application No. PCT/US17/66211, dated Apr. 13, 2018.
International Preliminary Report on Patentability for PCT Application No. PCT/US17/66211, dated Jun. 18, 2019.
Wikipedia Blind spot (vision), URL: https://en.wikipedia.org/wiki/Blind_spot(vision) printed Apr. 16, 2019 in 1 page.
Aieta, F. et al., "Multiwavelength achromatic metasurfaces by dispersive phase compensation," Science, vol. 347, Issue 6228, Mar. 20, 2015, in 5 pages. URL: www.sciencemag.org.
Arbabi, A. et al., "Dielectric metasurfaces for complete control of phase and polarization with subwavelength spatial resolution and high transmission," Nature Nanotechnology, published online Aug. 31, 2015, in 8 pages. URL: www.nature.com/naturenanotechnology.
Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.
Choi, Y. et al.: "Determination of Surface Nematic Liquid Crystal Anchoring Strength Using Nano-scale Surface Grooves," Optical Society of America, May 2013, in 10 pp.
Crawford, et al.: "Liquid-crystal diffraction gratings using polarization holography alighnment techniques," Journal of Applied Physics 98, 123102, 2005.
Cunningham et al., "A plastic colorimetric resonant optical biosensor for multiparallel detection of label-free biochemical interactions," Sensors and Actuators B, vol. 85, 2190226, Jul. 2002, in 8 pages.
Dierking, I.: "Chiral Liquid Crystals: Structures, Phases, Effects," Symmetry, (Jun. 2014) 6(2): 444- 472.
"Metamaterials". Duke University. Center for Metamaterials and Integrated Plasmonics. May 11, 2015 (Retrieved from the internet Aug. 12, 2016). URL: http://web.archive.org/web/20150511045547/http://metamaterials.duke.edu/research/metamaterials.
Escuti J., "Polarization-Independent Modulation & Simplified Spectropolarimetry Using Lc Polarization Gratings," paper #39.4, posters P-209, P-167, SID Symposium Digest, 2006.
Gear, C. et al.: "Engineered Liquid Crystal Anchoring Energies with Nanopatterned Surfaces," Optical Society of America, Jan. 2015, in 8 pp.
Komanduri, et al., "Multi-twist retarders: broadband retaration control using self-aligning reactive liquid crystal layers," Optical Society of America, Optics Express 404, vol. 21, No. 1, Jan. 14, 2013.
Kurioz, Y. et al.: "P-128: Orientation of a Reactive Mesogen on Photosensitive Surface," Society for Information Display (SID) Symposium Digest of Technical Papers, May 2007, in 3 pages.
Lee, et al., Negative dispersion of birefringence in two-dimensionally self-organized smectic liquid crystal and monomer thin film, Optics Letters, vol. 39, No. 17, Sep. 1, 2014.
Lin, D. et al., "Dielectric gradient metasurface optical elements", Science, vol. 345, Issue 6194, Jul. 18, 2014, in 6 pages.
Lin, D. et al., "Supplementary Materials for Dielectric gradient metasurface optical elements", Science, vol. 345, Issue 6194, Jul. 18, 2014, in 22 pages.
Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1):77-99.
Oh et al., "Polarization-Independent Modulation Using Standard Liquid Crystal Microdisplays and Polymer Polarization Gratings," NC State University; International Display Research Conference, vol. 28, pp. 298-301, 2008. in 16 pages.
Scheeline, et al., "Stacked Mutually Rotated Diffraction Gratings as Enablers of Portable Visible Spectrometry," Appl. Spectrosc. 70, 766-777, May 11, 2016.
Yang et al. Negative dispersion of birefringence of smectic liquid crystal-polymer compostie: dependence on the constituent molecules and temperature, Optical Society of America, Optics Express 2466, vol. 23, No. 3, Feb. 9, 2015.
Yu, N. et al., "Flat optics with designer metasurfaces", Review Article; Nature Materials, (Feb. 2014) 13: 139-150.
Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.
Chiu et al.: "P-33: Large Area Self-aligning of Liquid Crystal Molecules induced by Nanoimprinting Lithography and a Multiple Function Film Made Therein," Eurodisplay, Sep. 20, 2005-Sep. 22, 2020, pp. 323-325.

\* cited by examiner

PATTERNING OF LIQUID CRYSTALS USING SOFT-IMPRINT REPLICATION OF SURFACE ALIGNMENT PATTERNS

PRIORITY CLAIM

This application claims the benefit of priority under 35 U.S.C. § 119(e) of U.S. Provisional Application No. 62/434,343 filed on Dec. 14, 2016. The entire disclosure of each of these priority documents is incorporated herein by reference.

INCORPORATION BY REFERENCE

This application incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; U.S. application Ser. No. 14/331,218 filed on Jul. 14, 2014; and U.S. application Ser. No. 15/072,290 filed on Mar. 16, 2016.

BACKGROUND

Field

The present disclosure relates to display systems and, more particularly, to patterning and alignment of liquid crystals.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 1 is depicted wherein a user of an AR technology sees a real-world park-like setting 1100 featuring people, trees, buildings in the background, and a concrete platform 1120. In addition to these items, the user of the AR technology also perceives that he "sees" "virtual content" such as a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

According to some embodiments processes for patterning a liquid crystal polymer layers are described herein. In some embodiments a process may comprise contacting a liquid crystal polymer layer and a reusable alignment template comprising a surface alignment pattern such that liquid crystal molecules of the liquid crystal polymer layer are aligned to the surface alignment pattern of the reusable alignment template primarily via chemical, steric, or other intermolecular interaction, polymerizing the liquid crystal polymer layer; and separating the patterned polymerized liquid crystal polymer layer and the reusable alignment template, wherein the reusable alignment template comprises a photo-alignment layer comprising the surface alignment pattern.

In some embodiments the photo-alignment layer does not comprise surface relief structures corresponding to the surface alignment pattern. In some embodiments polymerizing the liquid crystal polymer layer comprises fixing the liquid crystals of the liquid crystal polymer in a desired alignment. In some embodiments contacting the liquid crystal polymer layer and the reusable alignment template comprises depositing the liquid crystal polymer layer on a surface of the reusable alignment template. In some embodiments depositing the liquid crystal polymer layer comprises jet depositing the liquid crystal polymer layer. In some embodiments depositing the liquid crystal polymer layer comprises spin-coating the liquid crystal polymer layer. In some embodiments separating the patterned polymerized liquid crystal polymer layer and the reusable alignment template comprises delaminating the patterned polymerized liquid crystal polymer layer from the reusable alignment template. In some embodiments the liquid crystal polymer layer is secured to a substrate prior to delaminating the patterned polymerized liquid crystal polymer layer from the reusable alignment template. In some embodiments contacting the liquid crystal polymer layer and the reusable alignment template comprises physically moving the liquid crystal polymer layer and/or the reusable alignment template such that a surface of the liquid crystal polymer layer contacts the a surface of the reusable alignment template. In some embodiments the liquid crystal polymer layer is disposed on a surface of a substrate prior to contacting the reusable alignment template. In some embodiments separating the patterned polymerized liquid crystal polymer layer and the reusable alignment template comprises physically moving the patterned polymerized liquid crystal polymer layer and the reusable alignment template away from one another. In some embodiments the substrate is optically transmissive. In some embodiments the reusable alignment template further comprises a release layer disposed over the photo-alignment layer. In some embodiments the release layer comprises fluorosilane or polydimethylsiloxane (PDMS). In some embodiments the reusable alignment template further comprises a liquid crystal polymer layer disposed between the photo-alignment layer and the release layer. In some embodiments the photo-alignment layer comprises photoresist. In some embodiments the patterned polymerized liquid crystal polymer layer comprises an alignment layer in a liquid crystal device. In some embodiments the patterned polymerized liquid crystal polymer layer comprises Pancharatnam-Berry phase effect (PBPE) structures. In some embodiments the PBPE structures comprise a diffraction grating. In some embodiments the patterned polymerized liquid crystal polymer layer comprises an undulating pattern, wherein the undulations are spaced apart by about from 1 nm to about 1 micron. In some embodiments the patterned polymerized liquid crystal polymer layer comprises an RMS surface roughness of less than about 1 nm. In some embodiments the patterned polymerized liquid crystal polymer layer comprises a sub-master alignment template.

According to some embodiments processes for patterning a liquid crystal polymer layers are described herein. In some embodiments a process may comprise depositing a liquid crystal polymer layer on a reusable alignment template comprising a surface alignment pattern such that liquid crystal molecules of the liquid crystal polymer layer are aligned to the surface alignment pattern of the reusable alignment template primarily via chemical, steric, or other intermolecular interaction, polymerizing the liquid crystal polymer layer, and delaminating the patterned polymerized liquid crystal polymer layer from the reusable alignment template, wherein the reusable alignment template comprises a photo-alignment layer comprising the surface alignment pattern. In some embodiments the photo-alignment layer does not comprise surface relief structure corresponding to the surface alignment pattern. In some embodiments the reusable alignment template further comprises a release layer disposed over the photo-alignment layer. In some embodiments the release layer comprises fluorosilane or polydimethylsiloxane (PDMS).

According to some embodiments processes for patterning a liquid crystal polymer layers are described herein. In some embodiments a process may comprise depositing a liquid crystal polymer layer on a surface of a substrate, contacting the deposited liquid crystal polymer layer with a reusable alignment template comprising a surface alignment pattern such that liquid crystal molecules of the liquid crystal polymer layer are aligned to the surface alignment pattern of the reusable alignment template primarily via chemical, steric, or other intermolecular interaction, polymerizing the liquid crystal polymer layer, and separating the reusable alignment template and the patterned polymerized liquid crystal polymer layer, wherein the reusable alignment template comprises a photo-alignment layer comprising the surface alignment pattern. In some embodiments the photo-alignment layer does not comprise surface relief structures corresponding to the surface alignment pattern. In some embodiments the reusable alignment template further comprises a release layer disposed over the photo-alignment layer. In some embodiments the release layer comprises fluorosilane or polydimethylsiloxane (PDMS).

According to some embodiments reusable alignment template for use in a liquid crystal soft-imprint alignment processes are described herein. In some embodiments the reusable alignment template may comprise a substrate, and a photo-alignment layer overlying the substrate, the photo-alignment layer comprising a surface alignment pattern, wherein the photo-alignment layer does not comprise surface relief structures corresponding to the surface alignment pattern.

In some embodiments the reusable alignment template may further comprise a release layer overlying the photo-alignment layer. In some embodiments the release layer comprises fluorosilane or polydimethylsiloxane (PDMS). In some embodiments the reusable alignment template may further comprises a liquid crystal polymer layer disposed between the photo-alignment layer and the release layer. In some embodiments the surface alignment pattern comprises Pancharatnam-Berry phase effect (PBPE) features. In some embodiments the surface alignment pattern comprises an inverse of Pancharatnam-Berry phase effect (PBPE) features. In some embodiments the PBPE features comprise a diffraction grating pattern. In some embodiments the photo-alignment layer comprises photoresist.

According to some embodiments processes for fabricating a reusable alignment template for use in a liquid crystal soft-imprint alignment process are described herein. In some embodiments the process comprises depositing a photo-alignment layer on a surface of a substrate, and photo-patterning the photo-alignment layer to form a desired surface alignment pattern therein, wherein the photo-alignment layer does not comprise surface relief structures corresponding to the surface alignment pattern. In some embodiments the process further comprises depositing a release layer over the photo-patterned photo-alignment layer.

In some embodiments the release layer comprises fluorosilane or polydimethylsiloxane (PDMS). In some embodiments the process further comprises depositing a liquid crystal polymer layer on the photo-patterned photo-alignment layer prior to depositing the release layer over the photo-patterned photo-alignment layer. In some embodiments the surface alignment pattern comprises Pancharatnam-Berry phase effect (PBPE) features. In some embodiments the surface alignment pattern comprises an inverse of Pancharatnam-Berry phase effect (PBPE) features. In some embodiments the PBPE features comprise a diffraction grating pattern. In some embodiments the photo-alignment layer comprises photoresist. In some embodiments said photo-alignment layer is substantially optically transmissive or transparent. In some embodiments said photo-alignment layer is substantially optically transmissive or transparent. In some embodiments the liquid crystal polymer layer is polymerized by passing light through said photo-alignment layer. The systems, methods and devices of the disclosure each have several innovative aspects, no single one of which is solely responsible for the desirable attributes disclosed herein.

The systems, methods and devices of the disclosure each have several innovative aspects, no single one of which is solely responsible for the desirable attributes disclosed herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

Accordingly, various example processes and structures are described herein.

EXAMPLES

1. A process for patterning a liquid crystal polymer layer, the processing comprising:
  contacting a liquid crystal polymer layer and a reusable alignment template comprising a surface alignment pattern such that liquid crystal molecules of the liquid crystal polymer layer are aligned to the surface alignment pattern of the reusable alignment template primarily via chemical, steric, or other intermolecular interaction;
  polymerizing the liquid crystal polymer layer; and
  separating the patterned polymerized liquid crystal polymer layer and the reusable alignment template,
  wherein the reusable alignment template comprises a photo-alignment layer comprising the surface alignment pattern.

2. The process of Example 1, wherein the photo-alignment layer does not comprise surface relief structures corresponding to the surface alignment pattern.

3. The process of any of the Examples above, wherein polymerizing the liquid crystal polymer layer comprises fixing the liquid crystals of the liquid crystal polymer in a desired alignment.

4. The process of any of the Examples above, wherein contacting the liquid crystal polymer layer and the reusable alignment template comprises depositing the liquid crystal polymer layer on a surface of the reusable alignment template.

5. The process of Example 4, wherein depositing the liquid crystal polymer layer comprises jet depositing the liquid crystal polymer layer.

6. The process of Example 4, wherein depositing the liquid crystal polymer layer comprises spin-coating the liquid crystal polymer layer.

7. The process of any one of Examples 4-6, wherein separating the patterned polymerized liquid crystal polymer layer and the reusable alignment template comprises delaminating the patterned polymerized liquid crystal polymer layer from the reusable alignment template.

8. The process of Example 7, wherein the liquid crystal polymer layer is secured to a substrate prior to delaminating the patterned polymerized liquid crystal polymer layer from the reusable alignment template.

9. The process of any one of Examples 1-3, wherein contacting the liquid crystal polymer layer and the reusable alignment template comprises physically moving the liquid crystal polymer layer and/or the reusable alignment template such that a surface of the liquid crystal polymer layer contacts the a surface of the reusable alignment template.

10. The process of Example 9, wherein the liquid crystal polymer layer is disposed on a surface of a substrate prior to contacting the reusable alignment template.

11. The process of any one of Examples 9 or 10, wherein separating the patterned polymerized liquid crystal polymer layer and the reusable alignment template comprises physically moving the patterned polymerized liquid crystal polymer layer and the reusable alignment template away from one another.

12. The process of any one of Examples 8, 10, or 11, wherein the substrate is optically transmissive.

13. The process of any of the Examples above, wherein the reusable alignment template further comprises a release layer disposed over the photo-alignment layer.

14. The process of Example 13, wherein the release layer comprises fluorosilane or polydimethylsiloxane (PDMS).

15. The process of any one of Examples 13 or 14, wherein the reusable alignment template further comprises a liquid crystal polymer layer disposed between the photo-alignment layer and the release layer.

16. The process of any of the Examples above, wherein the photo-alignment layer comprises photoresist.

17. The process of any of the Examples above, wherein the patterned polymerized liquid crystal polymer layer comprises an alignment layer in a liquid crystal device.

18. The process of any of the Examples above, wherein the patterned polymerized liquid crystal polymer layer comprises Pancharatnam-Berry phase effect (PBPE) structures.

19. The process of Example 18, wherein the PBPE structures comprise a diffraction grating.

20. The process of any of the Examples above, wherein the patterned polymerized liquid crystal polymer layer comprises an undulating pattern, wherein the undulations are spaced apart by about from 1 nm to about 1 micron.

21. The process of any of the Examples above, wherein the patterned polymerized liquid crystal polymer layer comprises an RMS surface roughness of less than about 1 nm.

22. The process of any of the Examples above, wherein the patterned polymerized liquid crystal polymer layer comprises a sub-master alignment template.

23. A process for patterning a liquid crystal polymer layer, the process comprising:
  depositing a liquid crystal polymer layer on a reusable alignment template comprising a surface alignment pattern such that liquid crystal molecules of the liquid crystal polymer layer are aligned to the surface alignment pattern of the reusable alignment template primarily via chemical, steric, or other intermolecular interaction;
  polymerizing the liquid crystal polymer layer; and
  delaminating the patterned polymerized liquid crystal polymer layer from the reusable alignment template,
  wherein the reusable alignment template comprises a photo-alignment layer comprising the surface alignment pattern.

24. The process of Example 23, wherein the photo-alignment layer does not comprise surface relief structure corresponding to the surface alignment pattern.

25. The process of any one of Examples 23 or 24, wherein the reusable alignment template further comprises a release layer disposed over the photo-alignment layer.

26. The process of Example 25, wherein the release layer comprises fluorosilane or polydimethylsiloxane (PDMS).

27. A process for patterning a liquid crystal polymer layer, the processing comprising:
  depositing a liquid crystal polymer layer on a surface of a substrate;
  contacting the deposited liquid crystal polymer layer with a reusable alignment template comprising a surface alignment pattern such that liquid crystal molecules of the liquid crystal polymer layer are aligned to the surface alignment pattern of the reusable alignment template primarily via chemical, steric, or other intermolecular interaction;
  polymerizing the liquid crystal polymer layer; and
  separating the reusable alignment template and the patterned polymerized liquid crystal polymer layer,
  wherein the reusable alignment template comprises a photo-alignment layer comprising the surface alignment pattern.

28. The process of Example 27, wherein the photo-alignment layer does not comprise surface relief structures corresponding to the surface alignment pattern.

29. The process of any one of Examples 27 or 28, wherein the reusable alignment template further comprises a release layer disposed over the photo-alignment layer.

30. The process of Example 29, wherein the release layer comprises fluorosilane or polydimethylsiloxane (PDMS).

31. A reusable alignment template for use in a liquid crystal soft-imprint alignment process, the reusable alignment template comprising;
  a substrate; and
  a photo-alignment layer overlying the substrate, the photo-alignment layer comprising a surface alignment pattern,
  wherein the photo-alignment layer does not comprise surface relief structures corresponding to the surface alignment pattern.

32. The reusable alignment template of Example 31, further comprise a release layer overlying the photo-alignment layer.

33. The process of Example 32, wherein the release layer comprises fluorosilane or polydimethylsiloxane (PDMS).

34. The reusable alignment template of any one of Examples 32 or 33, further comprising a liquid crystal polymer layer disposed between the photo-alignment layer and the release layer.

35. The reusable alignment template of any one of Examples 31-34, wherein the surface alignment pattern comprises Pancharatnam-Berry phase effect (PBPE) features.

36. The reusable alignment template of any one of Examples 31-34, wherein the surface alignment pattern comprises an inverse of Pancharatnam-Berry phase effect (PBPE) features.

37. The reusable alignment template of any one of Examples 35 or 36, wherein the PBPE features comprise a diffraction grating pattern.

38. The reusable alignment template of any one of Examples 31-37, wherein the photo-alignment layer comprises photoresist.

39. A process for fabricating a reusable alignment template for use in a liquid crystal soft-imprint alignment process, the process comprising:
depositing a photo-alignment layer on a surface of a substrate; and
photo-patterning the photo-alignment layer to form a desired surface alignment pattern therein,
wherein the photo-alignment layer does not comprise surface relief structures corresponding to the surface alignment pattern.

40. The process of Example 39, further comprising depositing a release layer over the photo-patterned photo-alignment layer.

41. The process of Example 40, wherein the release layer comprises fluorosilane or polydimethylsiloxane (PDMS).

42. The process of any one of Examples 40 or 41, further comprising depositing a liquid crystal polymer layer on the photo-patterned photo-alignment layer prior to depositing the release layer over the photo-patterned photo-alignment layer.

43. The process of any one of Examples 39-42, wherein the surface alignment pattern comprises Pancharatnam-Berry phase effect (PBPE) features.

44. The process of any one of Examples 39-42, wherein the surface alignment pattern comprises an inverse of Pancharatnam-Berry phase effect (PBPE) features.

45. The process of any one of Examples 43 or 44, wherein the PBPE features comprise a diffraction grating pattern.

46. The process of any one of Examples 39-45, wherein the photo-alignment layer comprises photoresist.

47. The process of any of the Examples above, wherein said photo-alignment layer is substantially optically transmissive or transparent.

48. The process or reusable alignment template of any of the Examples above, wherein said photo-alignment layer is substantially optically transmissive or transparent.

49. The process or reusable alignment template of Example 48, wherein the liquid crystal polymer layer is polymerized by passing light through said photo-alignment layer.

Figure 1:
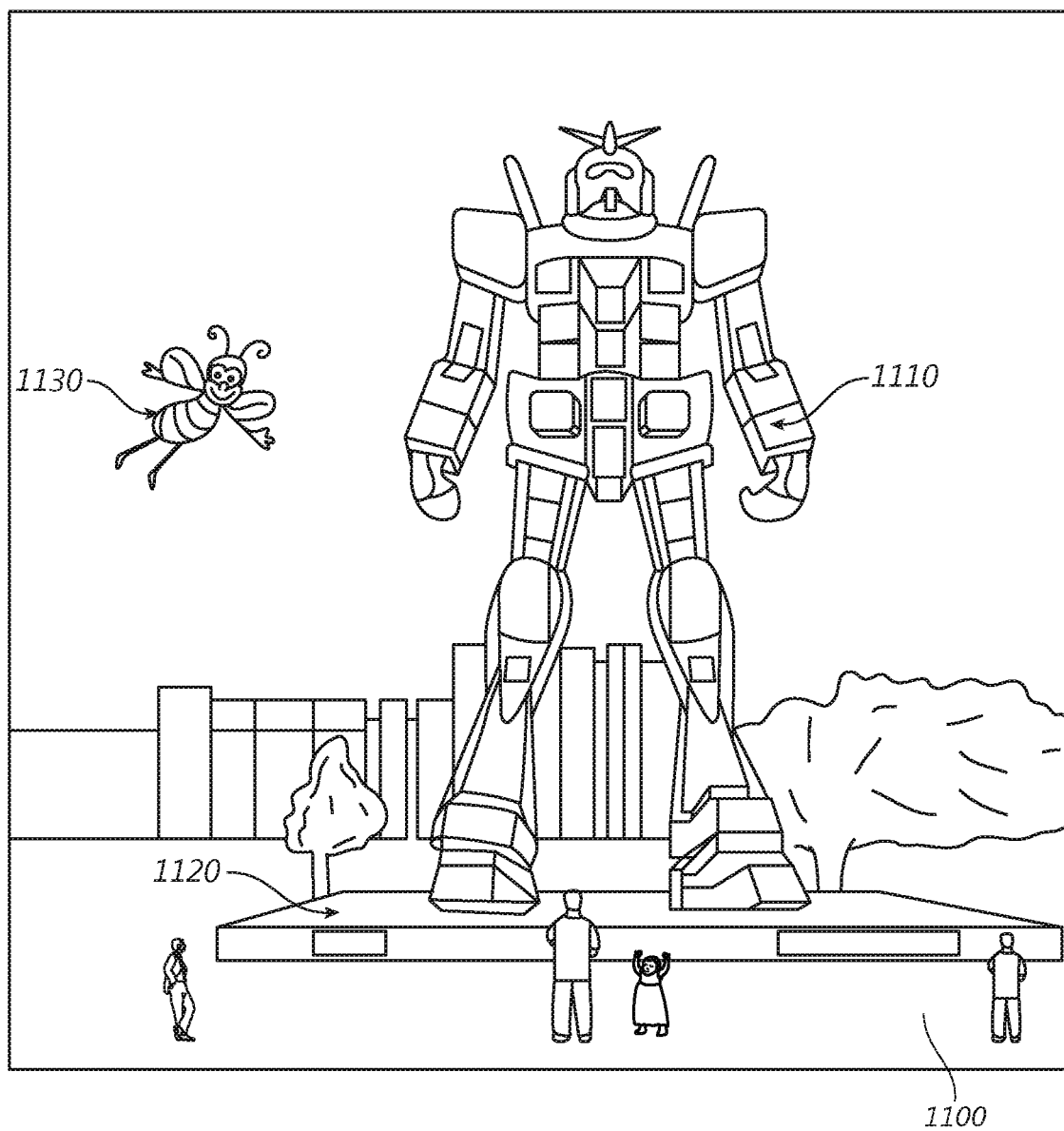
FIG. 1 illustrates a user's view of augmented reality (AR) through an AR device.

The drawings are provided to illustrate example embodiments and are not intended to limit the scope of the disclosure.

DETAILED DESCRIPTION

In some embodiments the liquid crystal molecules of a liquid crystal polymer layer may be aligned in a desired alignment pattern via a form of contact replication referred to as soft-imprint replication, or soft-imprint alignment which can replicate the surface pattern of an alignment template, also referred to as a master alignment template, in the liquid crystal polymer layer. Such a process may be used to produce liquid crystal polymer layers having a desired surface alignment pattern. An aligned liquid crystal polymer layer may be useful in an optical element, for example, in an optical element described herein, such as an incoupling element. In some embodiments, for example, a liquid crystal polymer layer comprising a desired alignment pattern may comprise a liquid crystal polarization grating, a liquid crystal diffraction grating, and/or other liquid crystal optical elements. The liquid crystal polymer layer may comprise a space-variant nano-scale patterns of liquid crystal materials that can be used to manipulate phase, amplitude and/or polarization of incident light and may comprise a liquid crystal metasurface, a liquid crystal metamaterials and/or liquid crystal based Pancharatnam-Berry phase optical elements (PBPE).

In some embodiments an alignment pattern may be formed in a liquid crystal polymer layer, for example, the surface of an liquid crystal polymer layer, by a soft-imprint process comprising contacting the liquid crystal polymer layer and a reusable alignment template comprising a desired surface alignment pattern corresponding to the desired alignment pattern of the liquid crystal polymer layer. The liquid crystals of the liquid crystal polymer layer are aligned to the surface alignment pattern primarily via chemical, steric, or other intermolecular interaction with the alignment template. In some embodiments the liquid crystal polymer layer may be polymerized subsequent to contacting the liquid crystal polymer layer and the reusable alignment template. After polymerization has occurred, in some embodiments, the liquid crystal polymer layer and reusable alignment template may be separated to thereby form a polymerized liquid crystal polymer layer having the desired alignment pattern. In this way the surface alignment pattern of the alignment template is replicated in the polymerized liquid crystal polymer layer. Such a process where liquid crystal molecule alignment occurs primarily via chemical, steric, or other intermolecular interaction with the alignment template may also be referred to as a soft-imprint alignment process, or soft-imprint replication process. Further, because the alignment template is reusable, such a process may be repeated many times without the need for processing separate alignment layers for each liquid crystal polymer layer. Advantageously, this allows for simplifying the manufacturing processes of devices comprising a patterned liquid crystal polymer such as, for example, an optical device comprising a patterned liquid crystal polymer layer.

In some embodiments, a soft-imprint replication process may comprise forming or depositing a liquid crystal polymer layer on the surface of a reusable alignment template such that the liquid crystal molecules of the deposited liquid crystal polymer layer are aligned to the alignment pattern of the reusable alignment template. Thereafter the deposited and aligned liquid crystal polymer layer may be polymerized and separated, or delaminated from the reusable alignment template. The patterned liquid crystal polymer layer may be subjected to further processing, for example, the deposition of additional liquid crystal polymer layers thereon, to form a liquid crystal device.

In some other embodiments, a liquid crystal polymer layer may be formed or deposited on the surface of a substrate and a reusable alignment template may be brought into contact with the deposited liquid crystal polymer layer such that the liquid crystal molecules of the deposited liquid crystal polymer layer are aligned to the alignment pattern of the reusable alignment template. Thereafter, the liquid crystal polymer layer may be polymerized and the reusable alignment template may be removed from the polymerized liquid crystal polymer layer, which remains on the substrate. The patterned liquid crystal polymer layer may be subjected to further processing, for example, the deposition of additional liquid crystal polymer layers thereon, to form a liquid crystal device.

In some embodiments, the reusable alignment template comprises a photo-alignment layer disposed on a substrate. The photo-alignment layer may be patterned with a desired surface alignment pattern via a photo-patterning process. For example, in some embodiments the photo-alignment layer may comprise light-activated chemical species and patterning may be accomplished by exposing the photo-alignment layer to light in a desired pattern. In general, the photo-alignment layer does not comprise surface relief structures that correspond to the surface alignment pattern. That is, the photo-alignment layer does not comprise surface relief features which are configured to imprint or align a liquid crystal polymer layer with a surface alignment pattern. In some embodiments, the reusable alignment template may comprise a release layer deposited or formed on top of the surface alignment pattern. In some embodiments, the release layer allows for strong alignment conditions between the underlying alignment pattern of the reusable alignment template and the contacted liquid crystal polymer layers. That is, the release layer may not substantially interfere with chemical, steric, or other intermolecular reactions between the photo-alignment layer and the liquid crystal molecules of the liquid crystal polymer layer. In some embodiments, the release layer also allows for separation of the contacted and aligned liquid crystal polymer layer from the reusable alignment template without substantial damage to the liquid crystal polymer layer or the surface alignment pattern of the reusable alignment template. In some embodiments, the reusable alignment template may further comprise a liquid crystal polymer layer disposed between the photo-alignment layer and the reusable release layer. Advantageously, this liquid crystal polymer layer may improve photo and thermal stability of the alignment pattern, and may improve alignment conditions to provide for stronger liquid crystal molecule anchoring during soft-imprint alignment of a liquid crystal polymer layer.

Accordingly, processes for fabricating a reusable alignment template for use in soft-imprint alignment processes or soft-imprint replication processes are described herein. In some embodiments a process for fabricating a reusable alignment template may comprise depositing a photo-alignment layer on a substrate. The photo-alignment layer may be photo-patterned with a desired surface alignment pattern. The surface alignment pattern of the photo-alignment layer corresponds to the desired alignment pattern of the liquid crystal polymer layers that are to be subjected to the soft-imprint alignment process.

A release layer, as described above, may then be deposited over the patterned photo-alignment layer to form the reusable alignment template. In some embodiments a liquid crystal polymer layer is deposited on the patterned photo-alignment layer prior to the release layer, such that the liquid crystal polymer layer is disposed between the photo-alignment layer and the release layer, as described above.

Reference will now be made to the drawings, in which like reference numerals refer to like parts throughout.

Figure 2:
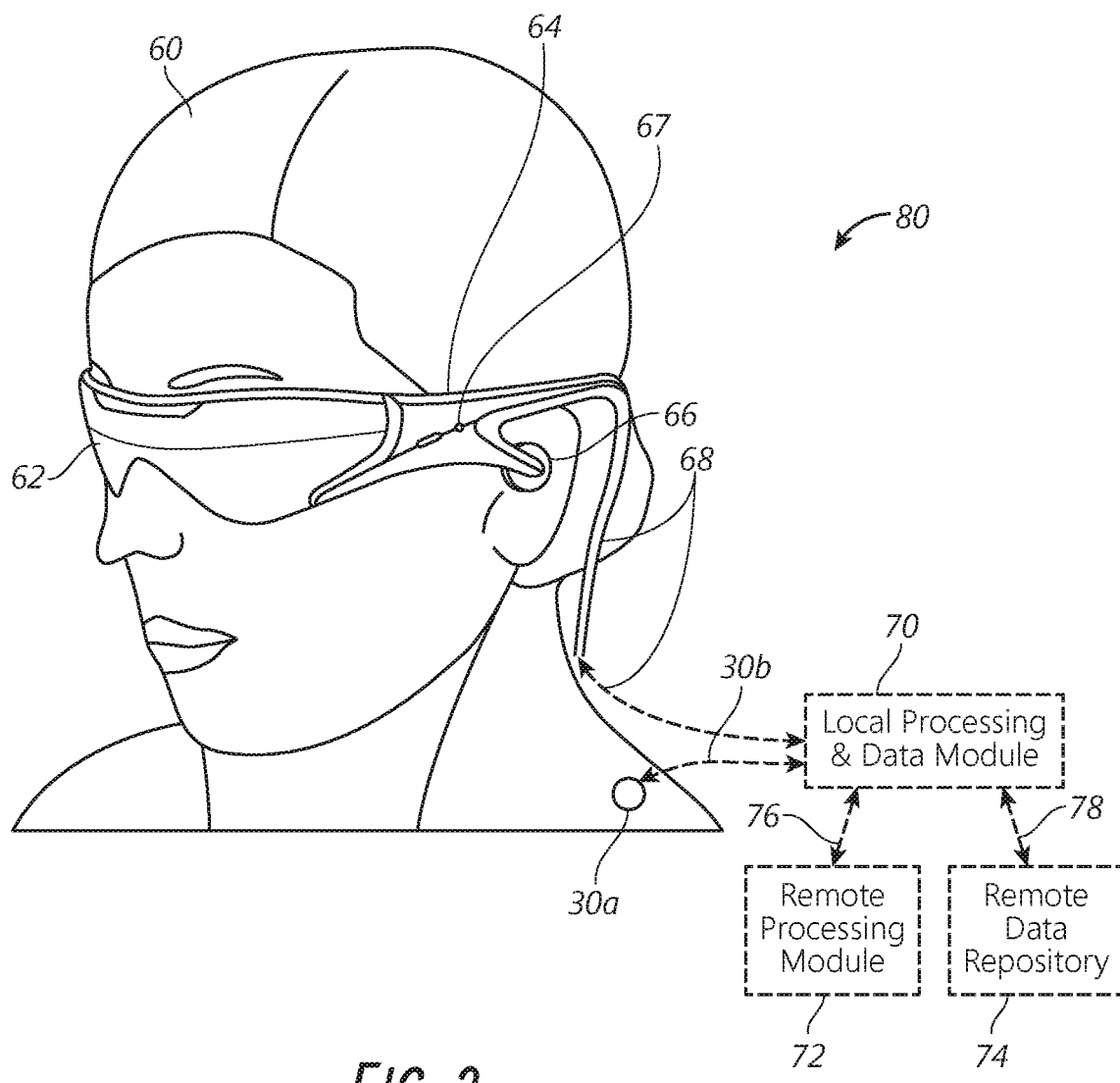
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.), and/or may allow audio communication with other persons (e.g., with other users of similar display systems The microphone may further be configured as a peripheral sensor to continuously collect audio data (e.g., to passively collect from the user and/or environment). Such audio data may include user sounds such as heavy breathing, or environmental sounds, such as a loud bang indicative of a nearby event. The display system may also include a peripheral sensor 30*a*, which may be separate from the frame 64 and attached to the body of the user 60 (e.g., on the head, torso, an extremity, etc. of the user 60). The peripheral sensor 30*a* may be configured to acquire data characterizing the physiological state of the user 60 in some embodiments, as described further herein. For example, the sensor 30*a* may be an electrode.

With continued reference to FIG. 2, the display 62 is operatively coupled by communications link 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). Similarly, the sensor 30*a* may be operatively coupled by communications link 30*b*, e.g., a wired lead or wireless connectivity, to the local processor and data module 70. The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, gyros, and/or other sensors disclosed herein; and/or b) acquired and/or processed using remote processing module 72 and/or remote data repository 74 (including data relating to virtual content), possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the local processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
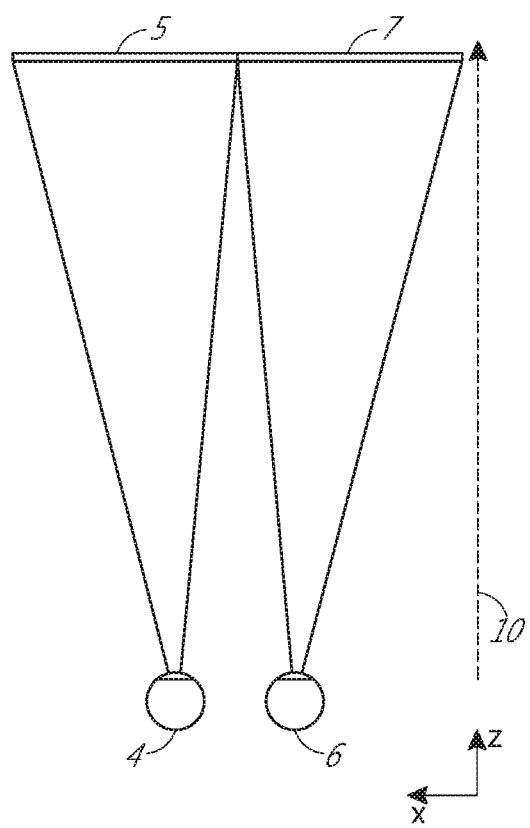
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
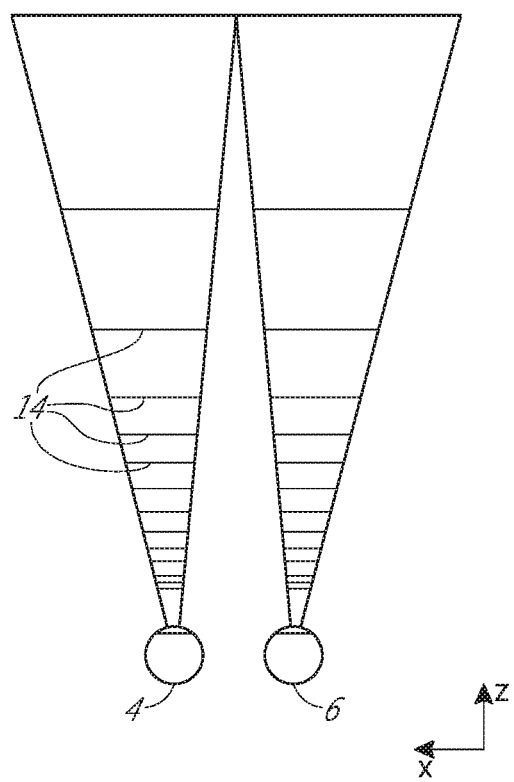
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
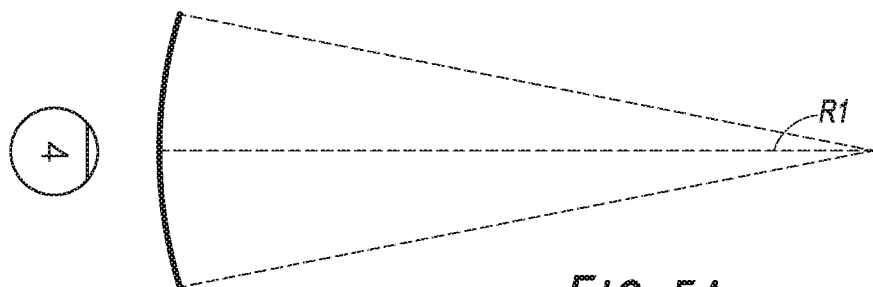
FIGS. 5A-5C illustrate relationships between radius of curvature and focal radius.
Figure 5B:
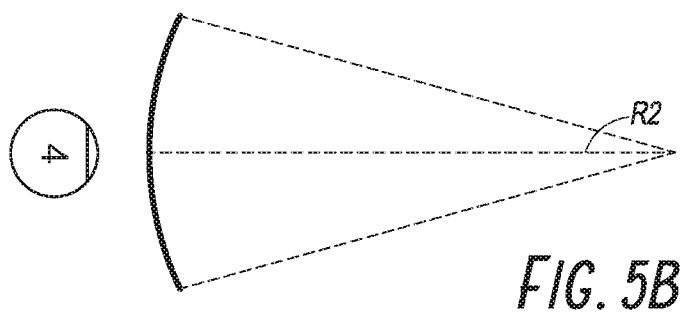
Figure 5C:
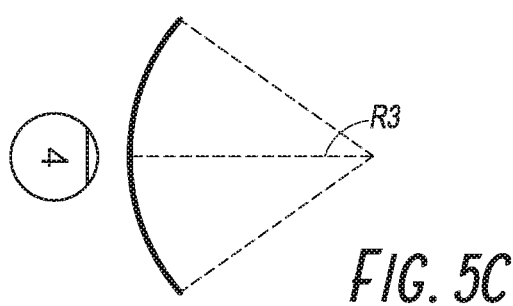

The distance between an object and the eye 4 or 6 may also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
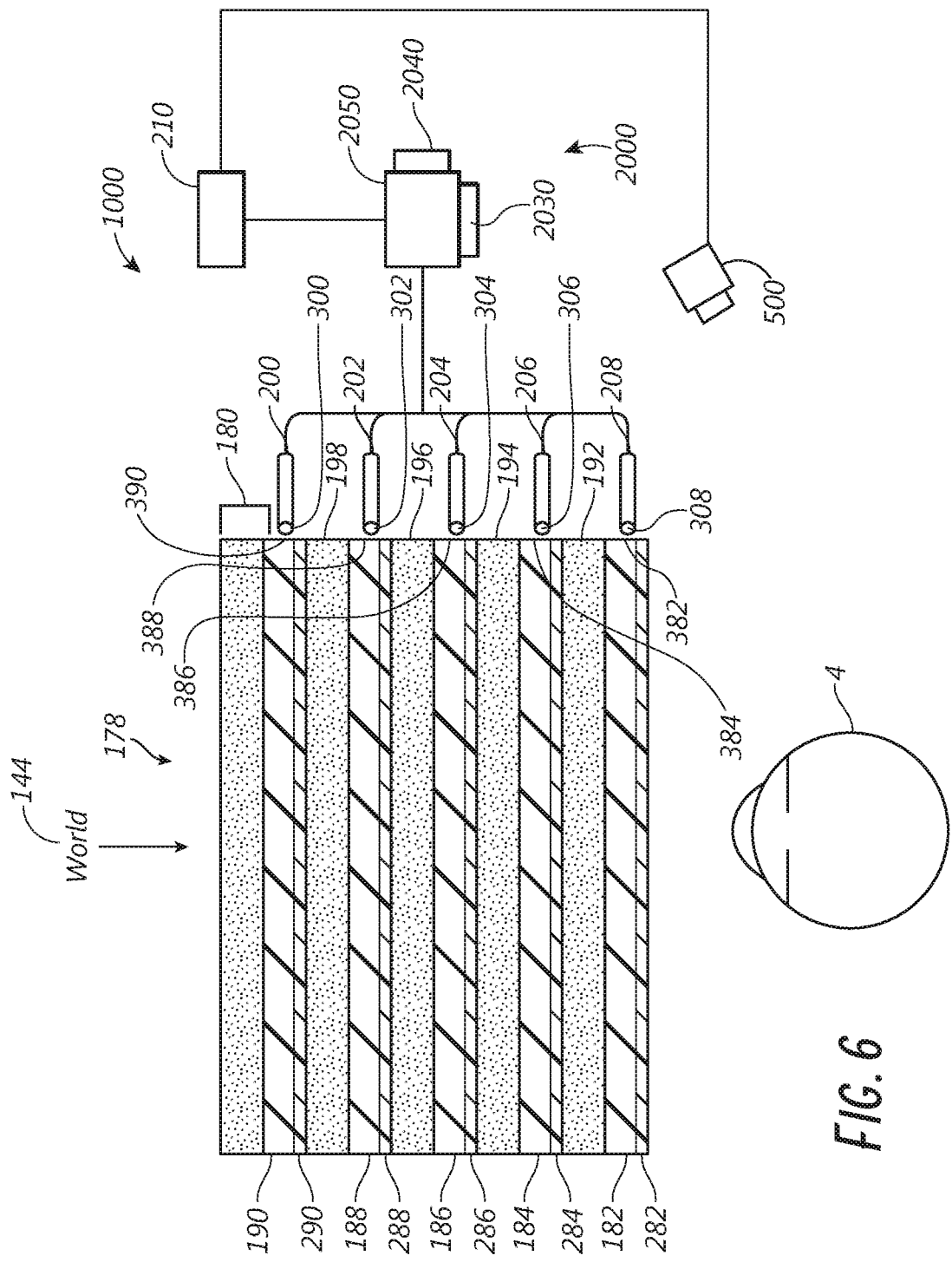
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 schematically showing some parts of that system 80 in greater detail. For example, the waveguide assembly 178 may be part of the display 62 of FIG. 2. It will be appreciated that the display system 1000 may be considered a light field display in some embodiments.

With continued reference to FIG. 6, the waveguide assembly 178 may also include a plurality of features 198, 196, 194, 192 between the waveguides. In some embodiments, the features 198, 196, 194, 192 may be one or more lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186, 188, 190. In some embodiments, the each of the input surfaces 382, 384, 386, 388, 390 may be an edge of a corresponding waveguide, or may be part of a major surface of the corresponding waveguide (that is, one of the waveguide surfaces directly facing the world 144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

In some embodiments, the light injected into the waveguides 182, 184, 186, 188, 190 is provided by a light projector system 2000, which comprises a light module 2040, which may include a light emitter, such as a light emitting diode (LED). The light from the light module 2040 may be directed to and modified by a light modulator 2030, e.g., a spatial light modulator, via a beam splitter 2050. The light modulator 2030 may be configured to change the perceived intensity of the light injected into the waveguides 182, 184, 186, 188, 190. Examples of spatial light modulators include liquid crystal displays (LCD) including a liquid crystal on silicon (LCOS) displays.

In some embodiments, the display system 1000 may be a scanning fiber display comprising one or more scanning fibers configured to project light in various patterns (e.g., raster scan, spiral scan, Lissajous patterns, etc.) into one or more waveguides 182, 184, 186, 188, 190 and ultimately to the eye 4 of the viewer. In some embodiments, the illustrated image injection devices 200, 202, 204, 206, 208 may schematically represent a single scanning fiber or a bundles of scanning fibers configured to inject light into one or a plurality of the waveguides 182, 184, 186, 188, 190. In some other embodiments, the illustrated image injection devices 200, 202, 204, 206, 208 may schematically represent a plurality of scanning fibers or a plurality of bundles of scanning, fibers each of which are configured to inject light into an associated one of the waveguides 182, 184, 186, 188, 190. It will be appreciated that the one or more optical fibers may be configured to transmit light from the light module 2040 to the one or more waveguides 182, 184, 186, 188, 190. It will be appreciated that one or more intervening optical structures may be provided between the scanning fiber, or fibers, and the one or more waveguides 182, 184, 186, 188, 190 to, e.g., redirect light exiting the scanning fiber into the one or more waveguides 182, 184, 186, 188, 190.

A controller 210 controls the operation of one or more of the stacked waveguide assembly 178, including operation of the image injection devices 200, 202, 204, 206, 208, the light source 2040, and the light modulator 2030. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 282, 284, 286, 288, 290 may, for example, be gratings, including diffractive optical features, as discussed further herein. While illustrated disposed at the bottom major surfaces of the waveguides 182, 184, 186, 188, 190 for ease of description and drawing clarity, in some embodiments, the outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images set to the same depth plane, or multiple subsets of the waveguides 182, 184, 186, 188, 190 may be configured to output images set to the same plurality of depth planes, with one set for each depth plane. This can provide advantages for forming a tiled image to provide an expanded field of view at those depth planes.

With continued reference to FIG. 6, the outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 282, 284, 286, 288, 290, which output light with a different amount of divergence depending on the associated depth plane. In some embodiments, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. In some embodiments, the features 198, 196, 194, 192 may not be lenses; rather, they may simply be spacers (e.g., cladding layers and/or structures for forming air gaps).

In some embodiments, the outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 500 (e.g., a digital camera, including visible light and infrared light cameras) may be provided to capture images of the eye 4 and/or tissue around the eye 4 to, e.g., detect user inputs and/or to monitor the physiological state of the user. As used herein, a camera may be any image capture device. In some embodiments, the camera assembly 500 may include an image capture device and a light source to project light (e.g., infrared light) to the eye, which may then be reflected by the eye and detected by the image capture device. In some embodiments, the camera assembly 500 may be attached to the frame 64 (FIG. 2) and may be in electrical communication with the processing modules 70 and/or 72, which may process image information from the camera assembly 500 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 500 may be utilized for each eye, to separately monitor each eye.

Figure 7:
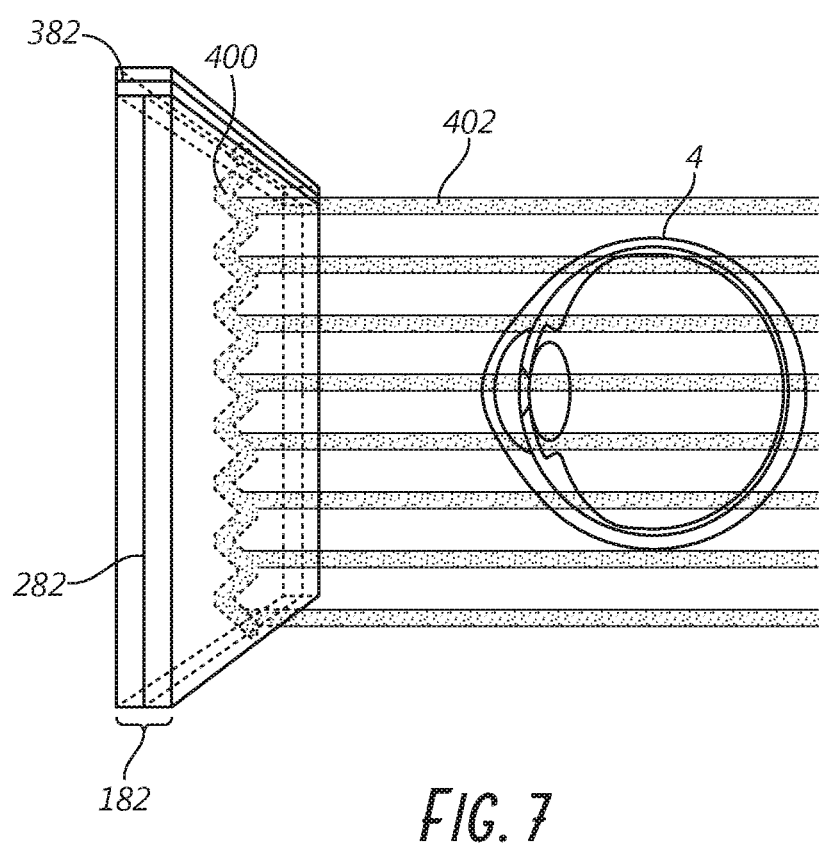
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 178 (FIG. 6) may function similarly, where the waveguide assembly 178 includes multiple waveguides. Light 400 is injected into the waveguide 182 at the input surface 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
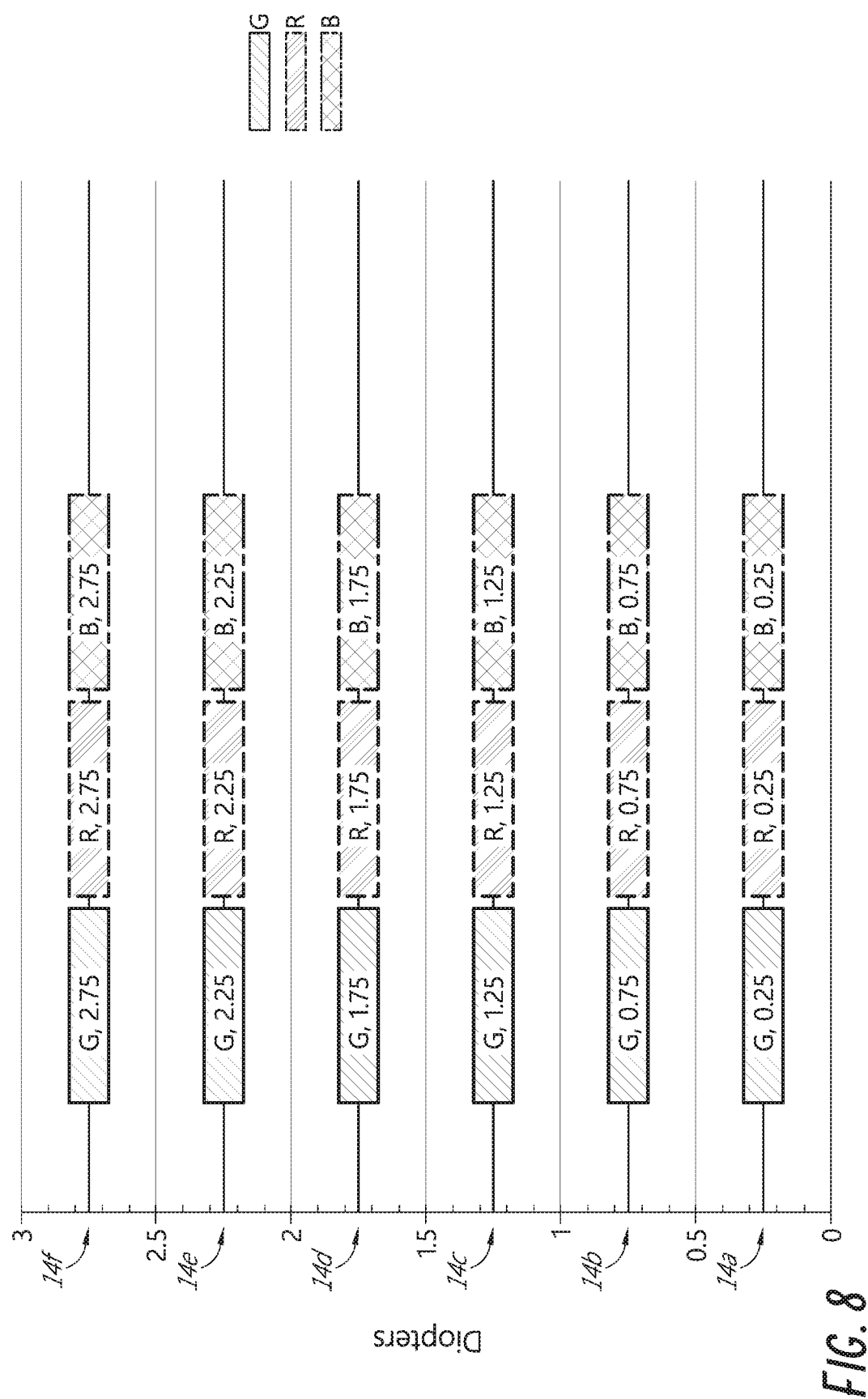
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 198, 196, 194, and 192 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 2040 (FIG. 6) may be configured to emit light of one or more wavelengths outside the visual perception range of the viewer, for example, infrared and/or ultraviolet wavelengths. In addition, the incoupling, outcoupling, and other light redirecting structures of the waveguides of the display 1000 may be configured to direct and emit this light out of the display towards the user's eye 4, e.g., for imaging and/or user stimulation applications.

Figure 9A:
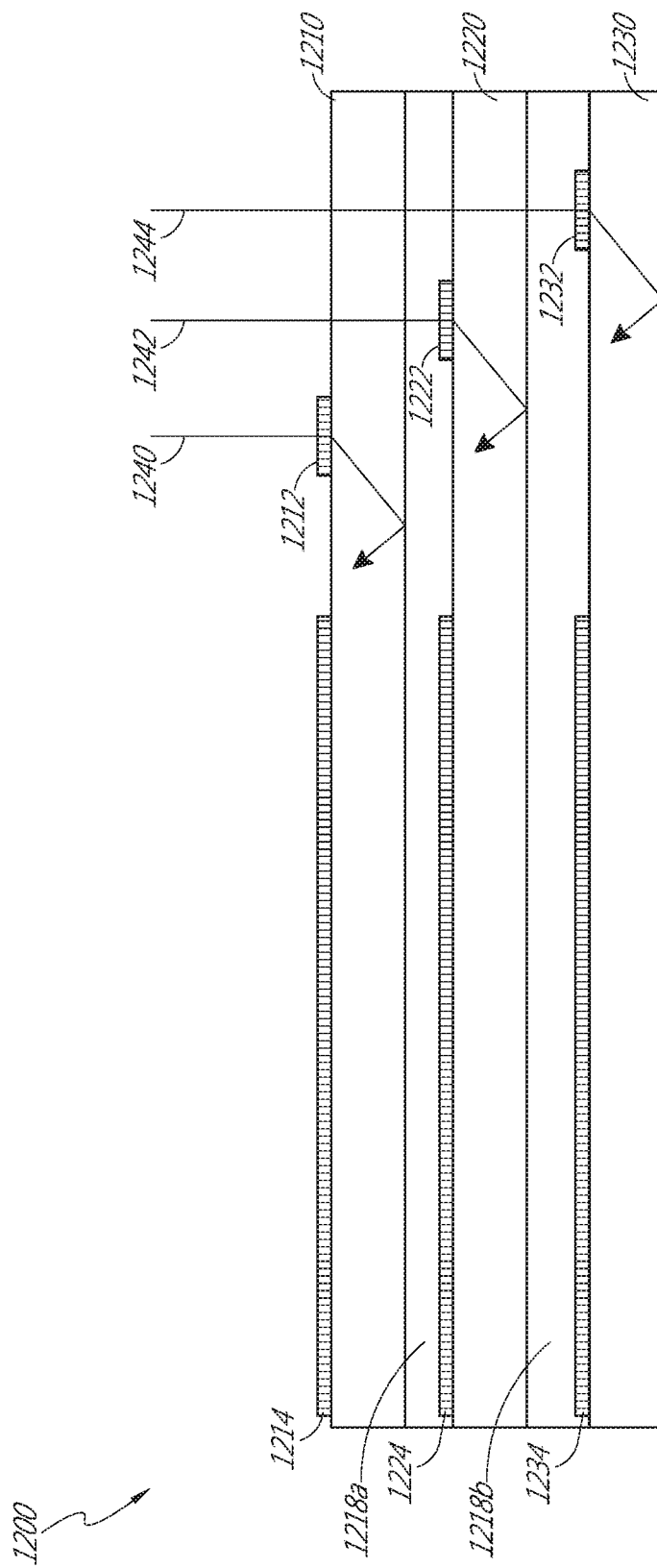
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 178 (FIG. 6) and the illustrated waveguides of the stack 1200 may correspond to part of the plurality of waveguides 182, 184, 186, 188, 190, except that light from one or more of the image injection devices 200, 202, 204, 206, 208 is injected into the waveguides from a position that requires light to be redirected for incoupling.

The illustrated set 1200 of stacked waveguides includes waveguides 1210, 1220, and 1230. Each waveguide includes an associated incoupling optical element (which may also be referred to as a light input area on the waveguide), with, e.g., incoupling optical element 1212 disposed on a major surface (e.g., an upper major surface) of waveguide 1210, incoupling optical element 1224 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 200, 202, 204, 206, and 208 as shown in FIG. 6, and may be separated (e.g., laterally spaced apart) from other incoupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by, e.g., gas, liquid, and/or solid layers of material. For example, as illustrated, layer 1218*a* may separate waveguides 1210 and 1220; and layer 1218*b* may separate waveguides 1220 and 1230. In some embodiments, the layers 1218*a* and 1218*b* are formed of low refractive index materials (that is, materials having a lower refractive index than the material forming the immediately adjacent one of waveguides 1210, 1220, 1230). Preferably, the refractive index of the material forming the layers 1218*a*, 1218*b* is 0.05 or more, or 0.10 or more less than the refractive index of the material forming the waveguides 1210, 1220, 1230. Advantageously, the lower refractive index layers 1218*a*, 1218*b* may function as cladding layers that facilitate total internal reflection (TIR) of light through the waveguides 1210, 1220, 1230 (e.g., TIR between the top and bottom major surfaces of each waveguide). In some embodiments, the layers 1218*a*, 1218*b* are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218*a*, 1218*b* are similar or the same. In some embodiments, the material forming the waveguides 1210, 1220, 1230 may be different between one or more waveguides, and/or the material forming the layers 1218*a*, 1218*b* may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 200, 202, 204, 206, 208 (FIG. 6).

In some embodiments, the light rays 1240, 1242, 1244 have different properties, e.g., different wavelengths or different ranges of wavelengths, which may correspond to different colors. The incoupling optical elements 1212, 122, 1232 each deflect the incident light such that the light propagates through a respective one of the waveguides 1210, 1220, 1230 by TIR.

For example, incoupling optical element 1212 may be configured to deflect ray 1240, which has a first wavelength or range of wavelengths. Similarly, the transmitted ray 1242 impinges on and is deflected by the incoupling optical element 1222, which is configured to deflect light of a second wavelength or range of wavelengths. Likewise, the ray 1244 is deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234.

Figure 9B:
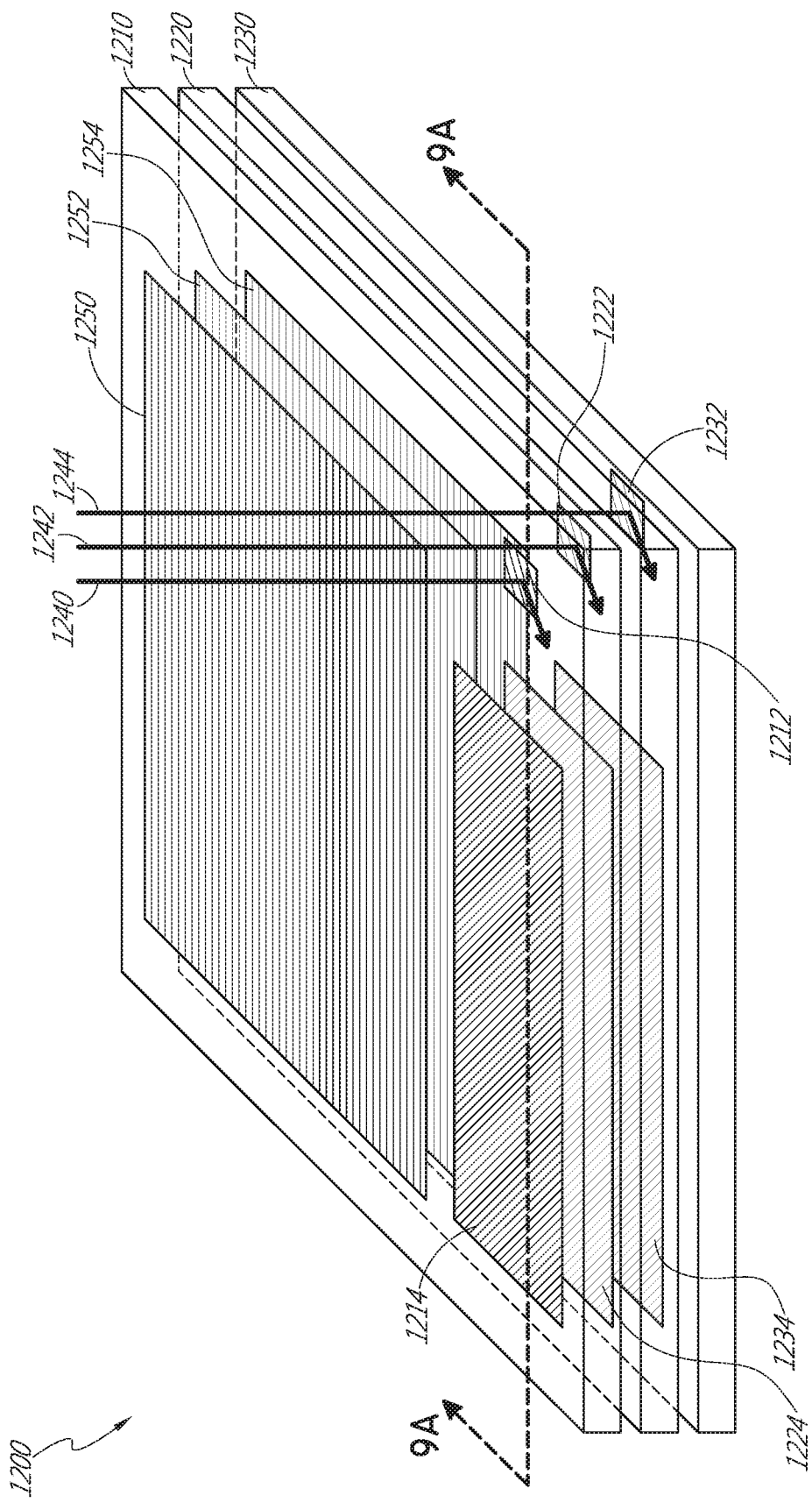
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1240 (e.g., blue light) is deflected by the first incoupling optical element 1212, and then continues to bounce down the waveguide, interacting with the light distributing element (e.g., OPE's) 1214 and then the outcoupling optical element (e.g., EPs) 1250, in a manner described earlier. The light rays 1242 and 1244 (e.g., green and red light, respectively) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EP's) 1252. Finally, light ray 1244 (e.g., red light) passes through the waveguide 1220 to impinge on the light incoupling optical elements 1232 of the waveguide 1230. The light incoupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
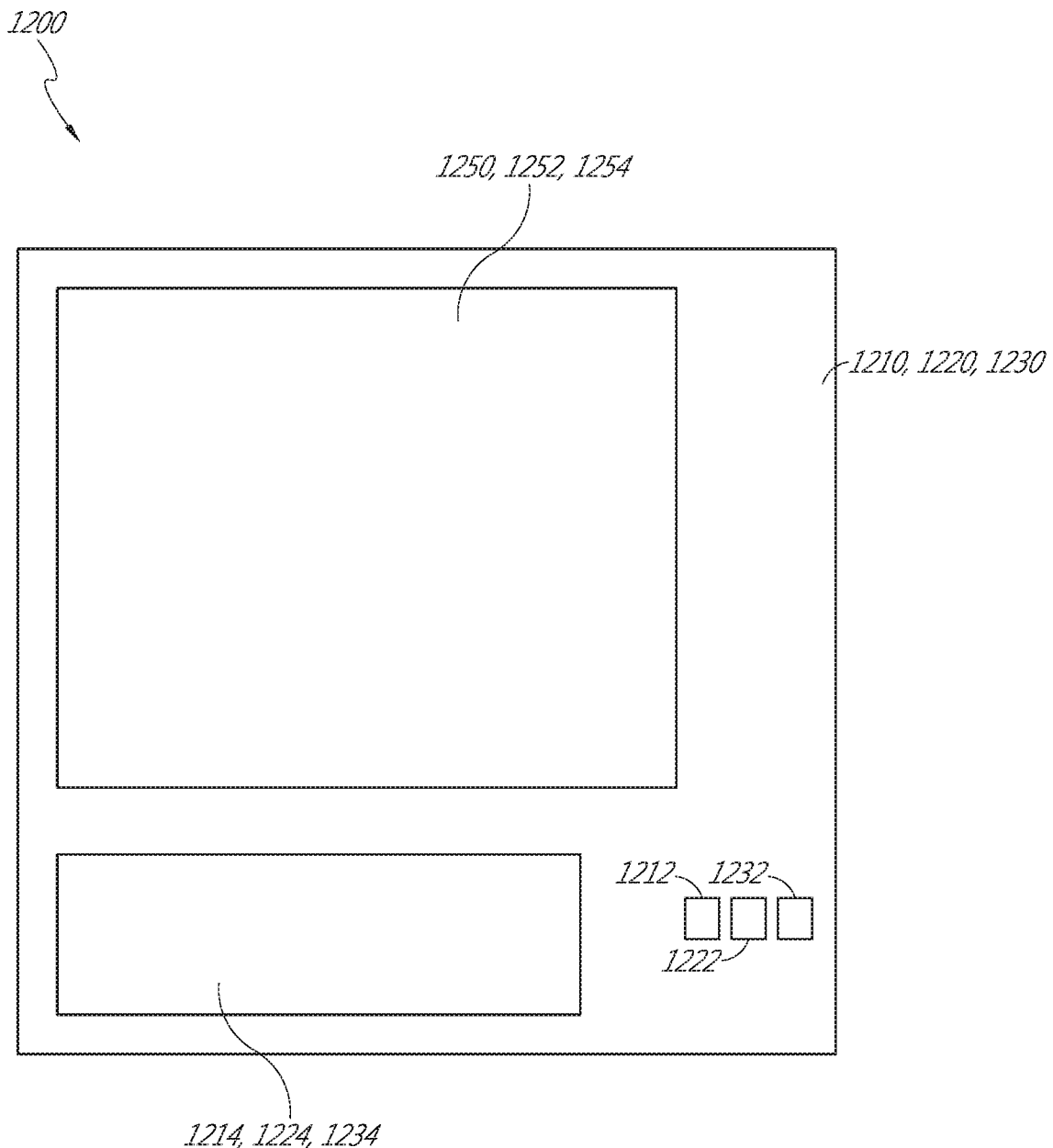
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated incoupling optical elements may be referred to as a shifted pupil system, and the in coupling optical elements within these arrangements may correspond to sub pupils.

Figure 10:
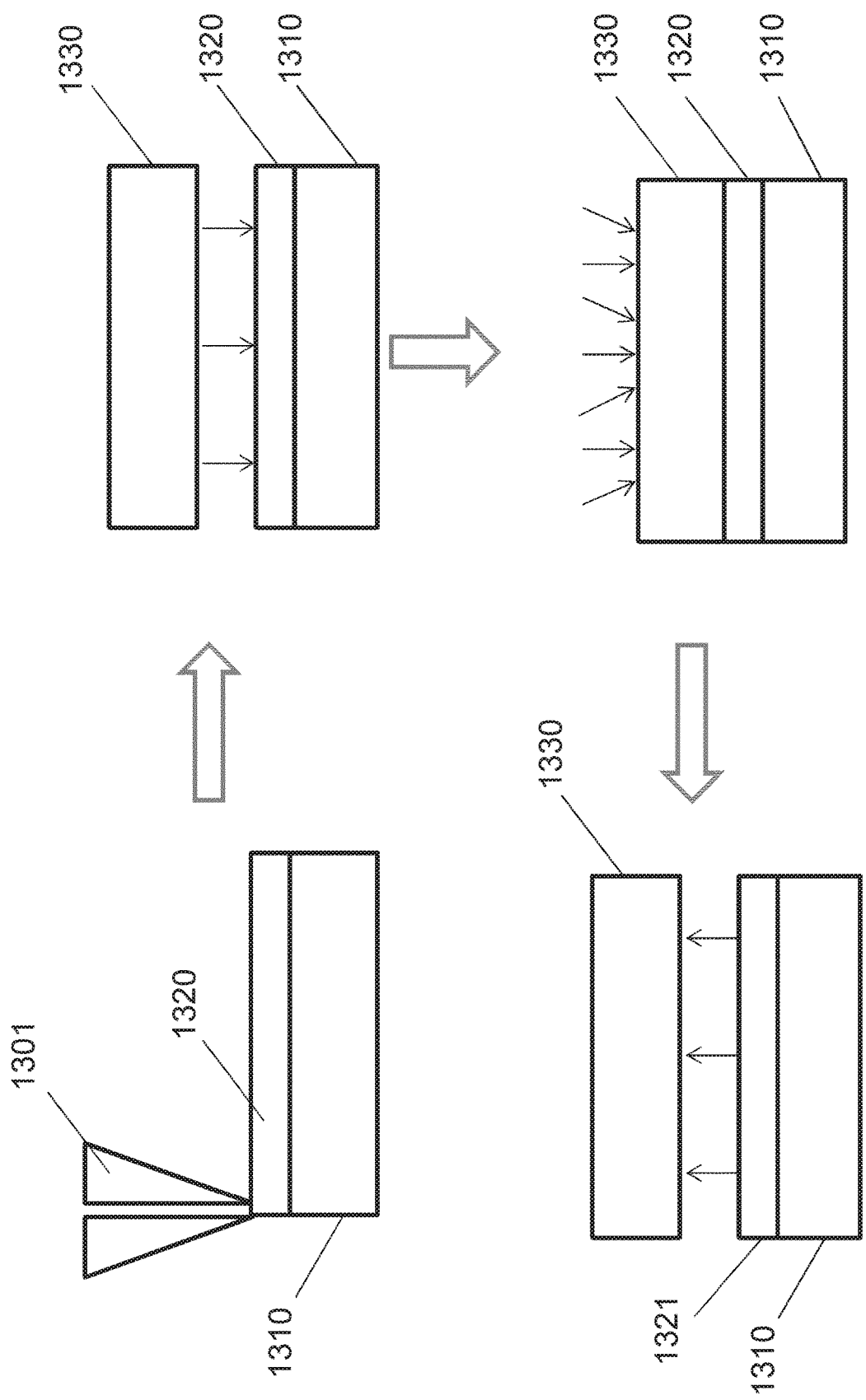
FIG. 10 is a schematic diagram showing an example process flow for soft-imprint alignment of a liquid crystal polymer layer using a reusable alignment template according to some embodiments.

With reference to FIG. 10, a schematic diagram showing an example process flow for the soft-imprint alignment of a liquid crystal polymer layer using a reusable alignment template is illustrated according to some embodiments. Initially a liquid crystal polymer layer 1320 is formed or deposited on the surface of a substrate 1310. In some embodiments the substrate 1310 may be optically transmissive. In some embodiments the substrate 1310 may comprise one or more waveguides. Examples of suitable materials for the substrate 1310 include, but are not limited to, glass, quartz, sapphire, indium tin oxide (ITO), or polymeric materials, including polycarbonate, polyacetate, and acrylic. In some embodiments, the substrate 1310 may be transmissive to light of visible wavelengths.

The liquid crystal polymer layer 1320 may be deposited via any deposition technique known in the art or developed in the future. In some embodiments the liquid crystal polymer layer 1320 may be deposited by, for example, a jet deposition process (e.g., inkjet technology), or by spin-coating liquid crystal material onto the substrate 1310. In some embodiments where jet deposition is used, a jet or stream of liquid crystal material is directed onto the substrate 1310 by a nozzle 1301 to form a relatively uniform liquid crystal polymer layer. The deposited liquid crystal polymer layer may have a thickness of, for example, between about 10 nm and 1 micron, or between about 10 nm and about 10 microns.

In some embodiments, the liquid crystal material may comprise nematic liquid crystals or cholesteric liquid crystal. In some embodiments, the liquid crystal material may comprise azo-containing polymers. In some embodiments, the liquid crystal material may comprise polymerizable liquid crystal materials. In some embodiments, the liquid crystal material may comprise reactive mesogens.

In some embodiments the deposited liquid crystal polymer layer 1320 is contacted with a reusable alignment template 1330 as described herein. In some embodiments the reusable alignment template 1330 may be lowered into contact with the liquid crystal polymer layer 1320 on the substrate 1310. As the reusable alignment template 1330 contacts the liquid crystal polymer layer 1320 the liquid crystal molecules naturally align themselves to the surface alignment pattern of the reusable alignment template 1330, thereby replicating the surface alignment pattern of the reusable alignment template 1330. In some embodiments this alignment occurs primarily due to chemical, steric, or other intermolecular interactions between the liquid crystal molecules of the liquid crystal polymer and the photo-alignment layer, as opposed to a process where alignment may occur primarily via physical imprinting, for example by imprinting with an alignment template that comprises surface relief structures corresponding to an alignment pattern. That is, in some embodiments the photo-alignment layer does not comprise surface relief features corresponding to the alignment pattern and may exert intermolecular forces on the liquid crystal molecules of the liquid crystal polymer layer such that the liquid crystal molecules align themselves to the alignment pattern of the photo-alignment layer. The liquid crystal molecules of the liquid crystal polymer layer 1320 may then be fixed in a desired alignment condition by polymerizing the liquid crystal polymer layer 1320 to thereby form the patterned liquid crystal polymer layer 1321. In some embodiments the alignment pattern formed in the patterned polymerized liquid crystal polymer layer 1321 primarily via chemical, steric, or other intermolecular interaction with the surface alignment pattern of the the reusable alignment template 1330 may comprise a diffraction grating, metasurface, or PBPE structures.

In some embodiments the liquid crystal polymer layer 1320 may be polymerized by any process known in the art of developed in the future. For example, in some embodiments the liquid crystal polymer layer 1320 may be polymerized by a cure process including exposure to UV light, heat, or both. The polymerized liquid crystal polymer layer 1321 thereafter comprises a surface alignment pattern corresponding to the surface alignment pattern of the reusable alignment template 1330. In some embodiments the patterned polymerized liquid crystal polymer layer 1321 may comprise liquid crystal features and/or patterns that have a size less than the wavelength of visible light and may comprise what are referred to as Pancharatnam-Berry Phase Effect (PBPE) structures, metasurfaces, or metamaterials. In some embodiments the patterned polymerized liquid crystal polymer layer 1321 may comprise a liquid crystal pattern, or aligned liquid crystal molecules. In some cases, the liquid crystal patterns in these features may be completely continuous with no surface relief structures that correspond to an alignment pattern. In some embodiments the surface alignment pattern is recorded within the patterned polymerized liquid crystal polymer layer 1321, for example in the form of aligned liquid crystal molecules, and the surface of the patterned polymerized liquid crystal polymer layer 1321 may be substantially flat. In some embodiments the RMS roughness of the patterned liquid crystal polymer layer 1321 may be from about 0.1 nm to about 1 nm, from about 0.5 nm to about 1 nm, from about 1 nm to about 3 nm, from about 2 nm to about 5 nm, or from about 3 nm to about 10 nm. In some cases, the small patterned features of the patterned polymerized liquid crystal polymer layer 1321 may have dimensions from about 1 nm to about 100 nm. In some embodiments the patterned polymerized liquid crystal polymer layer 1321 may comprise liquid crystal features which are periodic, with a period of from about 1 nm to about 100 nm, or from about 1 nm to about 1 micron. In some embodiments the patterned polymerized liquid crystal polymer layer 1321 may comprise an undulating or wave-like alignment pattern where the undulations are spaced apart by from about 1 nm to about 100 nm, or from about 1 nm to about 1 micron. In some cases, the small patterned features of the patterned polymerized liquid crystal polymer layer 1321 may have dimensions from about 1 nm to about 1 micron. Accordingly, the patterned polymerized liquid crystal polymer layer 1321 may comprise space-variant nano-scale patterns of liquid crystal materials that can be used to manipulate phase, amplitude and/or polarization of incident light and may comprise a liquid crystal metasurface, liquid crystal metamaterials and/or liquid crystal based Pancharatnam-Berry phase optical elements (PBPE).

Thus, in some embodiments the patterned liquid crystal polymer layer 1321 may comprise a liquid crystal grating or other structure for manipulating light. Structures for manipulating light, such as for beam steering, wavefront shaping, separating wavelengths and/or polarizations, and combining different wavelengths and/or polarizations may include liquid crystal gratings, with metasurfaces, metamaterials, or liquid crystal gratings with Pancharatnam-Berry Phase Effect (PBPE) structures or features. Liquid crystal gratings with PBPE structures and other metasurface and metamaterials may combine the high diffraction efficiency and low sensitivity to angle of incidence of liquid crystal gratings. In various embodiments, the liquid crystal polymer layer comprises space-variant nano-scale patterns of liquid crystal materials that can be used to manipulate phase, amplitude and/or polarization of incident light.

Subsequent to polymerizing the liquid crystal polymer layer 1320 to form the polymerized patterned liquid crystal polymer layer 1321, the reusable alignment template 1330 may be separated from the liquid crystal polymer layer 1321. For example, in some embodiments the reusable alignment template 1330 may be moved out of contact with the liquid crystal polymer layer 1321, which remains on the substrate 1310. The patterned liquid crystal polymer layer 1321 may then be subjected to further processing, for example to form an optical element as described herein, such as an incoupling optical element. In some embodiments the patterned liquid crystal polymer layer 1321 may serve as an alignment layer for additional liquid crystal polymer layers which are deposited thereon to form a liquid crystal device as described in U.S. Provisional Patent Application Nos. 62/424,305, 62/424,310, 62/424,293, and U.S. patent application Ser. No. 15/182,511, which are herein incorporated by reference in their entireties. Other liquid crystal layer may be formed thereon and aligned differently using additional alignment layers on such as additional reusable alignment templates.

Figure 11:
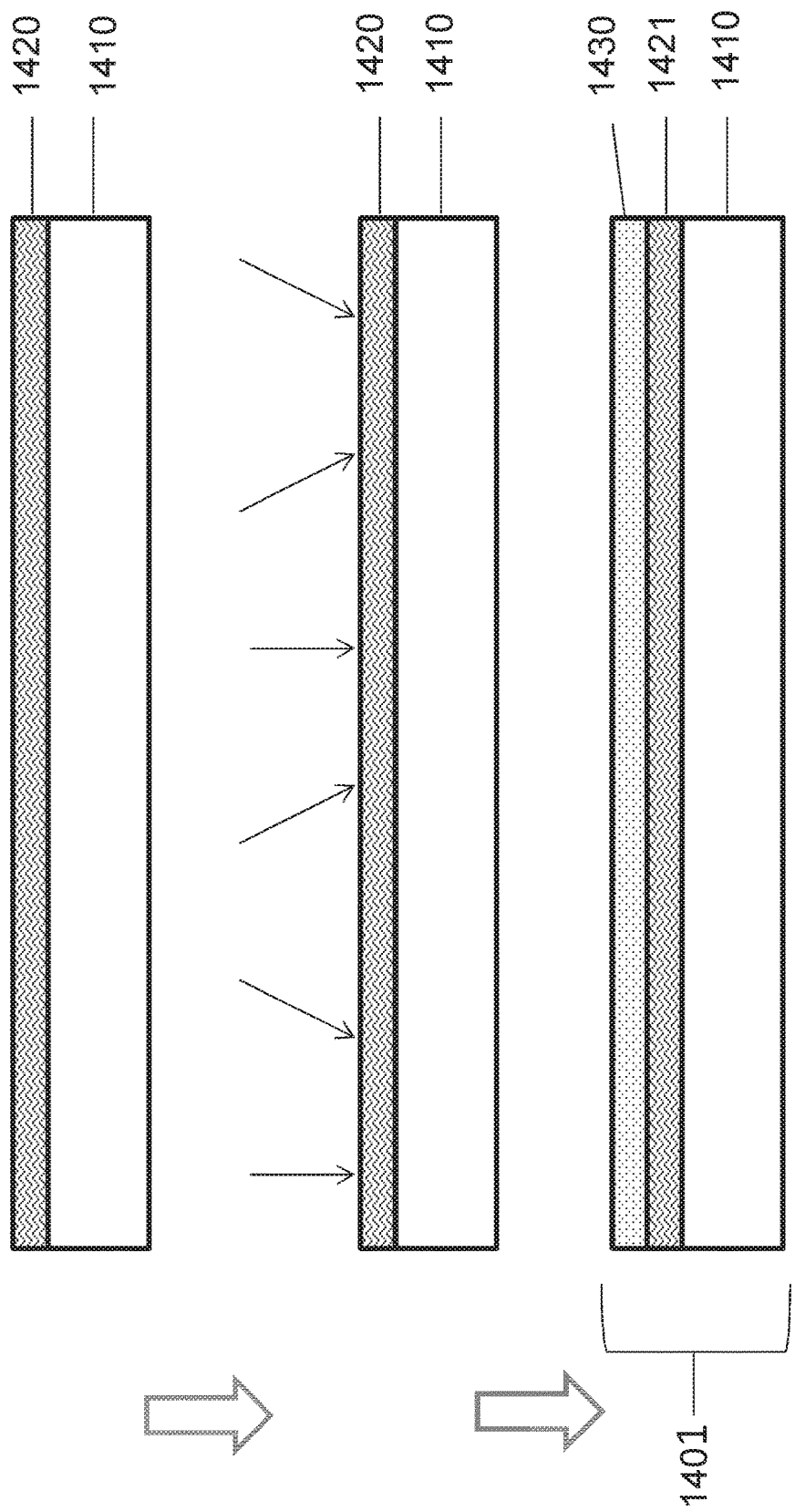
FIG. 11 is a schematic diagram showing an example process flow for forming a reusable alignment template for soft-imprint alignment of liquid crystal polymer layers according to some embodiments.

With reference now to FIG. 11, a schematic diagram showing an example process flow for forming a reusable alignment template 1401 for the alignment of liquid crystal polymer layers in a soft-imprint alignment or soft-imprint replication process is illustrated according to some embodiments. In some embodiments, a photo-alignment layer 1420 is formed or deposited on a substrate 1410. In some embodiments, the substrate 1410 is optically transmissive. Examples of suitable materials for the substrate 1410 include, but are not limited to, glass, quartz, sapphire, indium tin oxide (ITO), or polymeric materials, including polycarbonate, polyacetate, and acrylic. In some embodiments, the substrate 1410 may be transmissive to light of visible wavelengths.

In some embodiments, the photo-alignment layer 1420 may comprise a polymer material. In some embodiments, the photo-alignment layer 1420 may comprise any material capable of being photo-patterned. In some embodiments, the photo-alignment layer 1420 may be a layer that causes the liquid crystal molecules to assume a particular orientation or pattern primarily due to steric interactions with the liquid crystal molecules, chemical interactions with the liquid crystal molecules, and/or anchoring energy exerted on the liquid crystal molecule by the photo-alignment layer 1420, as opposed to an alignment layer comprising surface relief structures corresponding to an alignment pattern which may align liquid crystal molecules primarily via physical interaction. Examples of materials for the photo-alignment layer 1420 include resist (e.g., photoresist), polymers, and resins. As examples, the photo-alignment layer 1420 may include polyimide, linear-polarization photopolymerizable polymer (LPP), Azo-containing polymers, Courmarine-containing polymers and cinnamate-containing polymers.

The photo-alignment layer 1420 may be deposited via any deposition technique known in the art or developed in the future. In some embodiments the photo-alignment layer 1420 may be deposited by, for example, a jet deposition process (e.g., inkjet technology), or by spin-coating material onto the substrate 1410. In some embodiments where jet deposition is used, a jet or stream of material is directed onto the substrate 1410 by a nozzle to form a relatively uniform photo-alignment layer. The deposited photo-alignment layer 1420 may have a thickness of, for example, about 10 nm to about 100 nm or about 10 nm to about 300 nm.

The photo-alignment layer 1420 may be patterned to form patterned photo-alignment layer 1421. In some embodiments the photo-patterning process may be any photo-patterning process known in the art or developed in the future. The pattern may correspond to the desired grating or alignment pattern of the liquid crystal polarization grating which is to be replicated (e.g., the pattern may be identical to the desired pattern, or may be an inverse of the desired grating pattern). In some embodiments, the photo-alignment layer 1420 may contain light-activated chemical species and patterning may be accomplished by exposing the photo-alignment layer 1420 to light of having an appropriate wavelength for activating those chemical species. For example, a polarization interference pattern may be recorded in the photo-alignment layer 1420 by generating two orthogonal circularly polarized light beams (e.g., a left handed circularly polarized light beam and a right handed circularly polarized light beam) and directing those light beams to the photo-alignment layer 1420, which may be formed by a linear polarization photo-polymerizable polymer material. In some embodiments the patterned photo-alignment layer 1421 may not comprise surface relief structures that correspond to the surface alignment pattern. In some embodiments the patterned photo-alignment layer 1421 may be completely or substantially continuous and may not comprise surface relief structures that correspond to an alignment pattern. In some embodiments the photo-alignment layer 1421 may have an RMS surface roughness of from about 0.1 nm to about 1 nm, from about 0.5 nm to about 1 nm, from about 1 nm to about 3 nm, from about 2 nm to about 5 nm, or from about 3 nm to about 10 nm.

A release layer 1430 may be deposited over the patterned photo-alignment layer 1421 to form the reusable alignment template 1401. In some embodiments, as described herein, the release layer 1430 allows for strong alignment conditions between the underlying alignment pattern of the patterned photo-alignment layer 1421 and the contacted liquid crystal polymer layers during use of the reusable alignment template 1401. In some embodiments the release layer 1430 also allows for separation of contacted liquid crystal polymer layers from the reusable alignment template 1401 without substantial damage to the liquid crystal polymer layer or the alignment pattern of the reusable alignment template 1401. In some embodiments the release layer 1430 may comprise a silicon-containing material. In some embodiments the release layer may comprise fluorosilane. In some embodiments the release layer 1430 may comprise a siloxane. For example, in some embodiments the release layer 1430 may comprise polydimethylsiloxane (PDMS). In some embodiments the release layer 1430 may have a thickness of less than about 10 nm. In some embodiments, during a soft-imprint alignment process this release layer 1430 may occupy the space between a liquid crystal polymer layer and the patterned photo-alignment layer 1421, and as such, does not interfere, or substantially degrade the ability of the reusable alignment template 1401 to replicate the surface alignment pattern of the patterned photo-alignment layer 1421 in a soft-imprint alignment process. That is, the release layer 1430 allows for steric, chemical, or other intermolecular interaction between the liquid crystals of the liquid crystal polymer layer and the patterned photo-alignment layer 1421.

Figure 12:
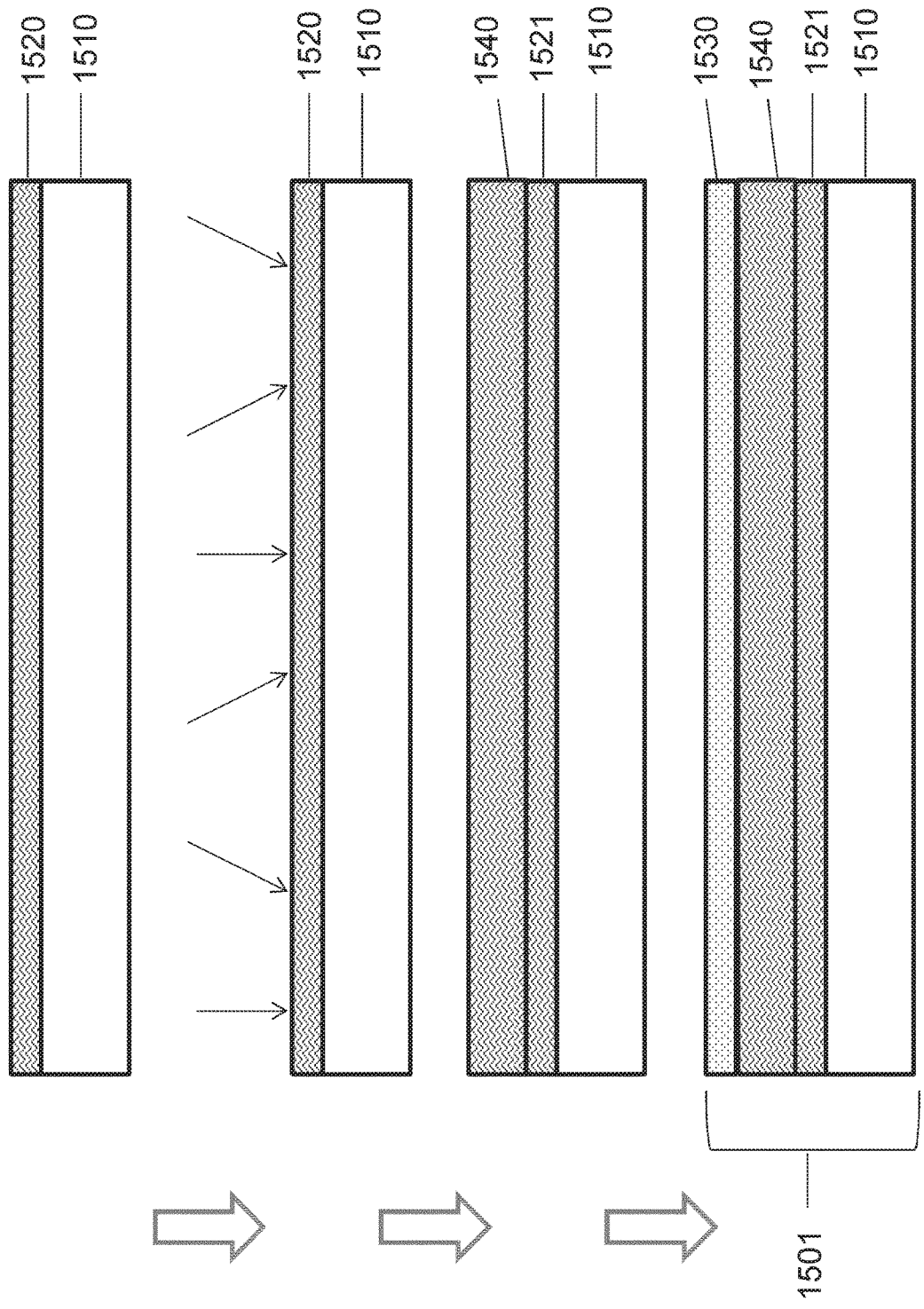
FIG. 12 is a schematic diagram showing another example process flow for forming a reusable alignment template for soft-imprint alignment of liquid crystal polymer layers according to some embodiments.

With reference now to FIG. 12, a schematic diagram showing an example process flow for forming a reusable alignment template 1501 for the alignment of liquid crystal polymer layers in a soft-imprint alignment or soft-imprint replication process is illustrated according to some other embodiments. Initially, a photo-alignment layer 1520 is formed or deposited on a substrate 1510 as described above with respect to FIG. 11. The photo-alignment layer 1520 is then patterned to form a patterned photo-alignment layer 1521, again as described above with respect to FIG. 11.

In some embodiments a liquid crystal polymer layer 1540 may be deposited over the patterned photo-alignment layer 1521 prior to deposition of a release layer 1530. In some embodiments, the liquid crystal polymer layer 1540 may comprise nematic liquid crystals or cholesteric liquid crystal. In some embodiments, the liquid crystal polymer layer 1540 may comprise azo-containing polymers. In some embodiments, the liquid crystal polymer layer 1540 may comprise polymerizable liquid crystal materials. In some embodiments, the liquid crystal polymer layer 1540 may comprise reactive mesogens. As described herein, in some embodiments the liquid crystal polymer layer 1540 may improve photo and thermal stability of the surface alignment pattern, and may improve alignment conditions to provide for stronger liquid crystal molecule anchoring during soft-imprint alignment of a liquid crystal polymer layer. In some embodiments the liquid crystal molecules of the liquid crystal polymer layer 1540 may align themselves to the surface alignment pattern of the patterned photo-alignment layer 1521 primarily via steric, chemical, or other intermolecular interactions with the photo-alignment layer 1521. As such, the liquid crystal polymer layer 1540 may not interfere, or substantially degrade the ability of the reusable alignment template 1501 to replicate the surface alignment pattern in a soft-imprint alignment process. In some embodiments a release layer 1530 may be deposited over the liquid crystal polymer layer 1540 as described above with respect to the release layer 1430 of FIG. 11.

Figure 13:
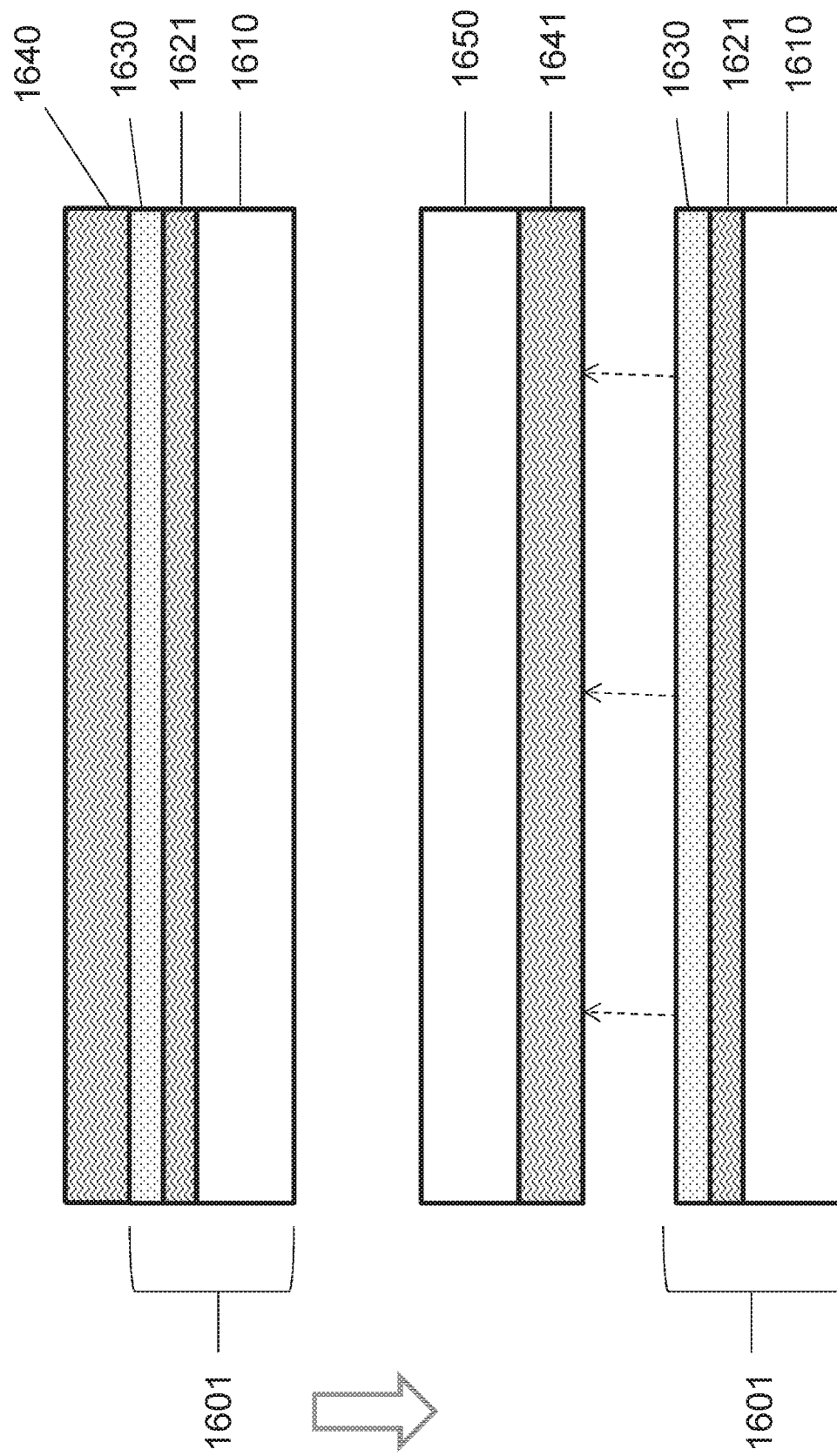
FIG. 13 is a schematic diagram showing an example process flow for the soft-imprint replication of a liquid crystal surface alignment pattern using direct deposition of a liquid crystal polymer layer on a reusable alignment template and according to some embodiments.

With reference now to FIG. 13, a schematic diagram showing an example process flow for the replication of a liquid crystal surface alignment pattern using direct deposition of a liquid crystal polymer layer 1640 on a reusable alignment template 1601 is illustrated according to some embodiments. This process may be referred to as a soft-imprint replication process or soft-imprint alignment process. In some embodiments the reusable alignment template

1601 may comprise a substrate 1610, a patterned alignment layer 1621, and a release layer 1630 as described herein, for example with respect to FIG. 11. In some embodiments the reusable alignment template 1601 may comprise a substrate 1610, a patterned alignment layer 1621, a liquid crystal polymer layer (not shown) and a release layer 1630 as described herein, for example with respect to FIG. 12.

In some embodiments, the liquid crystal polymer layer 1640 may be deposited on the reusable alignment template 1601 as described herein, for example with respect to FIG. 10. As the liquid crystal polymer layer 1640 is deposited on and comes into contact with the reusable alignment template 1601 the liquid crystal molecules of the liquid crystal polymer 1640 align themselves with the surface alignment pattern of the reusable alignment template 1601 primarily via chemical, steric, or other intermolecular interactions. In some embodiments, the liquid crystals of the liquid crystal polymer layer 1640 may be primarily aligned via chemical, steric, or other intermolecular interaction with the photo-alignment layer 1621 of the reusable alignment template 1601 under the release layer 1630 and/or liquid crystal polymer layer of the reusable alignment template.

The liquid crystal polymer layer 1640 is then polymerized in order to fix the desired alignment pattern and thereby form patterned liquid crystal polymer layer 1641 as described herein. Subsequent to polymerization, the patterned liquid crystal polymer layer 1641 may be removed from the reusable alignment template 1601, for example by delamination. In some embodiments, the patterned liquid crystal polymer layer 1641 may be secured or adhered to a substrate 1650, which is then spatially separated from the reusable alignment template 1601 in order to separate the patterned liquid crystal polymer layer 1641 from the reusable alignment template 1601, for example, by physically moving the liquid crystal polymer layer 1641 and substrate 1650 away from the reusable alignment template 1640. As described herein, the resultant patterned liquid crystal polymer layer 1641 and substrate 1650 can be subjected to further processing, for example, to form a liquid crystal device. In some embodiments, the patterned liquid crystal polymer layer 1641 can serve as an alignment layer for additional liquid crystal polymer layers, for example, in a liquid crystal device.

The above-described soft-imprint replication or alignment process may be repeated multiple times in order to produce multiple patterned liquid crystal polymer layers. Advantageously, this may simplify the manufacturing process for devices which include a patterned liquid crystal polymer layer as compared to other known processes for patterning liquid crystal polymer layers with complex spatial alignment patterns. In some embodiments the above-described soft-imprint replication process may be repeated as many times as desired. In some embodiments a soft-imprint replication process may be repeated from about 100 to about 1000 times, or from about 1000 to about 10,000 times using the same reusable alignment template 1601.

Figure 14:
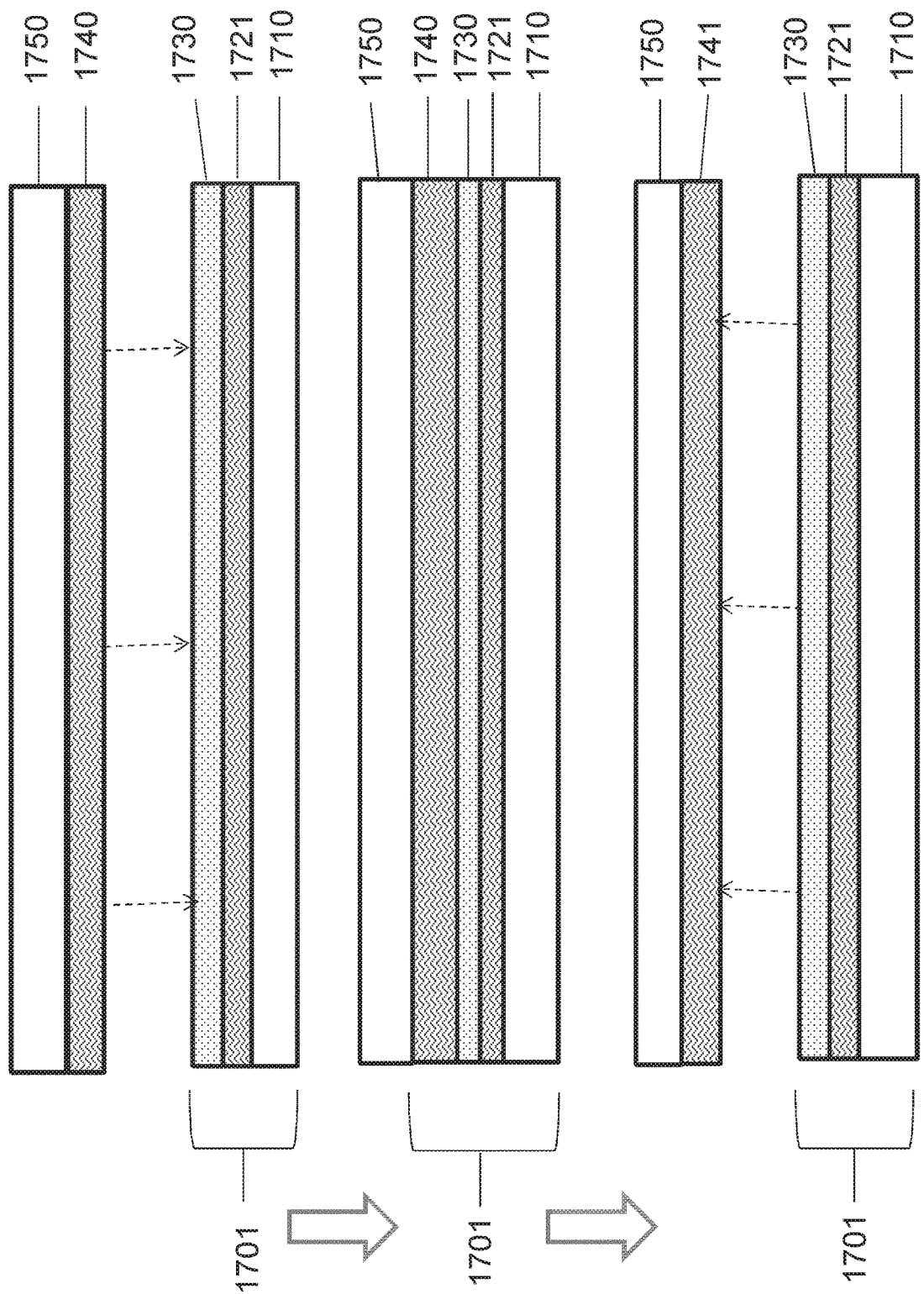
FIG. 14 is a schematic diagram showing an example process flow for the soft-imprint replication of a liquid crystal surface alignment pattern via contact between a liquid crystal polymer layer and a reusable alignment template and according to some embodiments.

With reference now to FIG. 14, a schematic diagram showing an example process flow for the soft-imprint replication of a surface alignment pattern using contact with a reusable alignment template and according to some embodiments is illustrated. A liquid crystal polymer layer 1740 is formed or deposited on a substrate 1750 as described herein, for example with respect to FIG. 10. The liquid crystal polymer layer 1740 on the substrate 1750 is physically brought into contact with a reusable alignment template 1701. In some embodiments substantially all of the surface of the liquid crystal polymer layer 1740 that is to be patterned contacts the surface of the reusable alignment template 1601 comprising the surface alignment pattern. In some embodiments the surface of the reusable alignment template 1601 is substantially continuous and does not comprise surface relief structures that correspond to the surface alignment pattern.

In some embodiments the liquid crystal polymer layer 1740 and substrate 1740 may be physically lowered into contact the reusable alignment template 1701 or the reusable alignment template 1701 may be physically raised into contact with the liquid crystal polymer layer 1740. Although the reusable alignment template 1701 is illustrated as being below the liquid crystal polymer layer 1740, in some other embodiments the reusable alignment template 1701 may be provided above the liquid crystal polymer layer 1740. In some embodiments, the liquid crystal polymer layer 1740 and reusable alignment template 1701 may be provided in any orientation as long as the liquid crystal polymer layer 1740 and reusable alignment template 1701 are able to contact each other such that the surface alignment pattern of the reusable alignment template 1701 is replicated on the liquid crystal polymer layer 1740. The reusable alignment template 1701 may be a reusable alignment template as described herein, for example with respect to FIGS. 11 and/or 12.

As the liquid crystal polymer layer 1740 comes into contact with the reusable alignment template 1701 the liquid crystal molecules of the liquid crystal polymer layer 1740 align to the surface alignment pattern of the reusable alignment template 1701 via chemical, steric, or other intermolecular interaction with the surface alignment pattern. In some embodiments, the liquid crystals of the liquid crystal polymer layer 1740 may be aligned via chemical, steric, or other intermolecular interaction with the photo-alignment layer 1721 or liquid crystal polymer layer of the reusable alignment template 1701 under the release layer 1730.

The liquid crystal polymer layer 1740 is then polymerized in order to fix the desired alignment pattern and thereby form patterned liquid crystal polymer layer 1741 as described herein. Subsequent to polymerization, the patterned liquid crystal polymer layer 1741 may be removed from the reusable alignment template 1701 by physically separating the patterned liquid crystal polymer layer 1741 and substrate 1750 to which it is secured or adhered. For example, in some embodiments the substrate 1750 and patterned liquid crystal polymer layer 1741 may be physically removed from the reusable alignment template 1701. As described herein, the resultant patterned liquid crystal polymer layer 1741 and substrate 1750 can be subjected to further processing, for example to form a liquid crystal device.

The above-described soft-imprint replication process may be repeated multiple times in order to produce multiple patterned liquid crystal polymer layers. Advantageously, this may simplify the manufacturing process for devices which include a patterned liquid crystal polymer layer as compared to other known processes for patterning liquid crystal polymer layers with complex spatial alignment patterns. In some embodiments the above-described soft-imprint replication process may be repeated as many times as desired. In some embodiments a soft-imprint replication process may be repeated from about 100 to about 1000 times, or from about 1000 to about 10,000 times using the same reusable alignment template 1701.

Figure 15:
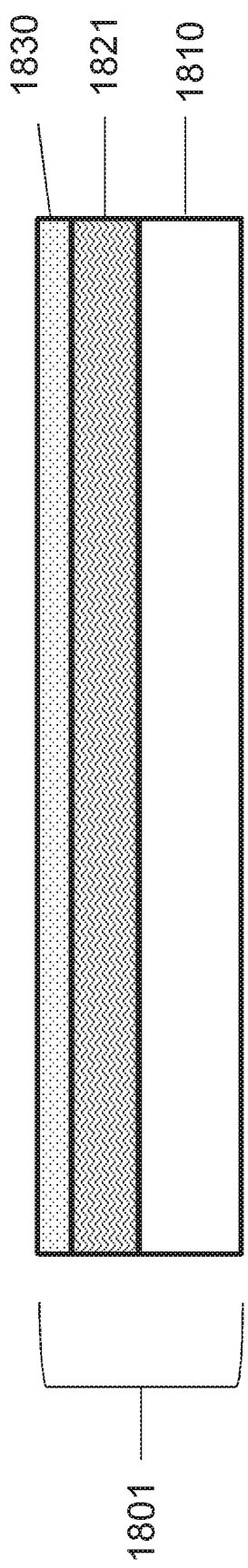
FIG. 15 is a schematic diagram of a sub-master alignment template formed according to some embodiments via a soft-imprint alignment process.

With reference now to FIG. 15, a schematic diagram of a sub-master alignment template formed according to some embodiments is illustrated. In some embodiments, a patterned liquid crystal polymer layer 1821 on a substrate 1810 formed according to the soft-imprint alignment processes described herein, for example with respect to FIGS. 10, 13, and/or 14, may be used as a sub-master alignment template. That is, a patterned liquid crystal polymer layer 1821 can be used as an alignment template 1801 after being formed by a soft-imprint replication processing using a reusable alignment template as described herein.

In some embodiments, a sub-master alignment template 1801 is fabricated by forming a patterned liquid crystal polymer layer 1821 on top of a substrate 1810 as described herein, for example, with respect to FIGS. 10, 13, and/or 14. A release layer 1830 may subsequently be deposited over the patterned liquid crystal polymer layer 1821 in a manner similar to that described above with respect to the release layers 1430, 1530 of FIGS. 11 and/or 12. In some embodiments this release layer 1830 does not interfere, or substantially degrade the ability of the sub-master alignment template 1801 to replicate the surface alignment pattern in a soft-imprint alignment process. In some embodiments, the sub-master alignment template 1801 may serve a substantially similar function to a reusable alignment template in a soft-imprint alignment process as described herein. In some embodiments, the sub-master alignment template 1801 may be a reusable alignment template.

In the foregoing specification, various specific embodiments have been described. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A process for patterning a liquid crystal polymer layer, the processing comprising:
   contacting a liquid crystal polymer layer and a reusable alignment template comprising a surface alignment pattern such that liquid crystal molecules of the liquid crystal polymer layer are aligned to the surface alignment pattern of the reusable alignment template primarily via chemical, steric, or other intermolecular interaction;
   polymerizing the liquid crystal polymer layer to form a patterned polymerized liquid crystal polymer layer; and
   separating the patterned polymerized liquid crystal polymer layer and the reusable alignment template,
   wherein the reusable alignment template comprises a photo-alignment layer comprising the surface alignment pattern;
   wherein contacting the liquid crystal polymer layer and the reusable alignment template comprises depositing the liquid crystal polymer layer on a surface of the reusable alignment template, wherein depositing the liquid crystal polymer layer further comprises jet depositing the liquid crystal polymer layer; and
   wherein the reusable alignment template further comprises a release layer disposed over the photo-alignment layer and a second liquid crystal polymer layer disposed between the photo-alignment layer and the release layer.

2. The process of claim 1, wherein the surface alignment pattern of the photo-alignment layer does not comprise surface relief structures.

3. The process of claim 1, wherein polymerizing the liquid crystal polymer layer comprises fixing liquid crystal molecules of the liquid crystal polymer in a desired alignment.

4. The process of claim 1, wherein separating the patterned polymerized liquid crystal polymer layer and the reusable alignment template comprises delaminating the patterned polymerized liquid crystal polymer layer from the reusable alignment template.

5. The process of claim 4, wherein the liquid crystal polymer layer or the patterned polymerized liquid crystal polymer layer is secured to a substrate prior to delaminating the patterned polymerized liquid crystal polymer layer from the reusable alignment template.

6. The process of claim 5, wherein the substrate is optically transmissive.

7. The process of claim 1, wherein the release layer comprises fluorosilane or polydimethylsiloxane (PDMS).

8. The process of claim 1, wherein the photo-alignment layer comprises a photoresist.

9. A process for patterning a liquid crystal polymer layer, the process comprising:
depositing a liquid crystal polymer layer on a reusable alignment template comprising a surface alignment pattern such that liquid crystal molecules of the liquid crystal polymer layer are aligned to the surface alignment pattern of the reusable alignment template primarily via chemical, steric, or other intermolecular interaction;
polymerizing the liquid crystal polymer layer to form a patterned polymerized liquid crystal polymer layer; and
delaminating the patterned polymerized liquid crystal polymer layer from the reusable alignment template,
wherein the reusable alignment template comprises a photo-alignment layer comprising the surface alignment pattern;
wherein depositing the liquid crystal polymer layer comprises spin-coating the liquid crystal polymer layer; and
wherein the reusable alignment template further comprises a release layer disposed over the photo-alignment layer and a second liquid crystal polymer layer disposed between the photo-alignment layer and the release layer.

10. The process of claim 9, wherein the substrate is optically transmissive.

11. The process of claim 9, wherein the surface alignment pattern of the photo-alignment layer does not comprise surface relief structures.

12. The process of claim 9, wherein the release layer comprises fluorosilane or polydimethylsiloxane (PDMS).

13. The process of claim 9, wherein the photo-alignment layer comprises a photoresist.

14. A process for patterning a liquid crystal polymer layer, the processing comprising:
depositing a liquid crystal polymer layer on a surface of a substrate to form a deposited liquid crystal polymer layer;
contacting the deposited liquid crystal polymer layer with a reusable alignment template comprising a surface alignment pattern such that liquid crystal molecules of the deposited liquid crystal polymer layer are aligned to the surface alignment pattern of the reusable alignment template primarily via chemical, steric, or other intermolecular interaction;
polymerizing the deposited liquid crystal polymer layer to form a patterned polymerized liquid crystal polymer layer; and
separating the reusable alignment template and the patterned polymerized liquid crystal polymer layer,
wherein the reusable alignment template comprises a photo-alignment layer comprising the surface alignment pattern; and
wherein the reusable alignment template further comprises a release layer disposed over the photo-alignment layer and a second liquid crystal polymer layer disposed between the photo-alignment layer and the release layer.

15. The process of claim 14, wherein contacting the deposited liquid crystal polymer layer with the reusable alignment template comprises physically moving the deposited liquid crystal polymer layer and/or the reusable alignment template such that a surface of the deposited liquid crystal polymer layer contacts a surface of the reusable alignment template.

16. The process of claim 15, wherein separating the patterned polymerized liquid crystal polymer layer and the reusable alignment template comprises physically moving the patterned polymerized liquid crystal polymer layer and the reusable alignment template away from one another.

17. The process of claim 14, wherein depositing the liquid crystal polymer layer further comprises jet depositing the liquid crystal polymer layer.

18. The process of claim 14, wherein the surface alignment pattern of the photo-alignment layer does not comprise surface relief structures.

19. The process of claim 14, wherein the release layer comprises fluorosilane or polydimethylsiloxane (PDMS).

20. The process of claim 14, wherein the photo-alignment layer comprises a photoresist.

* * * * *